US012598517B2

(12) United States Patent
Li et al.

(10) Patent No.: US 12,598,517 B2
(45) Date of Patent: Apr. 7, 2026

(54) COMMUNICATION METHOD AND APPARATUS FOR CONFIGURING MULTICAST QoS PARAMETER

(71) Applicant: HUAWEI TECHNOLOGIES CO., LTD., Guangdong (CN)

(72) Inventors: Meng Li, Beijing (CN); Jiangwei Ying, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 303 days.

(21) Appl. No.: 18/366,540

(22) Filed: Aug. 7, 2023

(65) Prior Publication Data

US 2023/0388863 A1 Nov. 30, 2023

Related U.S. Application Data

(63) Continuation of application No. PCT/CN2022/071897, filed on Jan. 13, 2022.

(30) Foreign Application Priority Data

Feb. 5, 2021 (CN) .......................... 202110162949.1

(51) Int. Cl.
| | |
|---|---|
| *H04W 28/24* | (2009.01) |
| *H04L 12/18* | (2006.01) |
| *H04W 4/08* | (2009.01) |

(52) U.S. Cl.
CPC ............. *H04W 28/24* (2013.01); *H04W 4/08* (2013.01); *H04L 12/189* (2013.01)

(58) Field of Classification Search
None
See application file for complete search history.

(56) References Cited

U.S. PATENT DOCUMENTS

2019/0158985 A1 5/2019 Dao et al.
2023/0082017 A1* 3/2023 Hong .................... H04W 76/22
370/312

(Continued)

FOREIGN PATENT DOCUMENTS

WO 2019223005 A1 11/2019

OTHER PUBLICATIONS

3GPP TS 23.501 V15.12.0 (Dec. 2020) 3rd Generation Partnership Project; Technical Specification Group Services and System Aspects; System architecture for the 5G System (5GS); Stage 2 (Release 15), total 244 pages.

(Continued)

*Primary Examiner* — Diane L Lo

(57) ABSTRACT

This application relates to the field of communication technologies, and provides a communication method and apparatus. In the method, a multicast session management function network element receives a PCC rule corresponding to a first multicast group from a policy control function network element; obtains, based on the PCC rule, a target multicast QoS parameter corresponding to the first multicast group and used for configuring a QoS parameter corresponding to the first multicast group; and sends the target multicast QoS parameter to an access network device, so that the access network device obtains the target multicast QoS parameter, and configures, based on the target multicast QoS parameter, the QoS parameter corresponding to the first multicast group. In this way, a multicast QoS parameter is configured.

17 Claims, 16 Drawing Sheets

1: Unicast session 1 2: Unicast session 2 3: Unicast session 3 4: Multicast session 4

The unicast session 1 and the unicast session 2 are used for delivering unicast data, the unicast session 3 is used for delivering the unicast data and multicast data, and the multicast session 4 is used for delivering the multicast data

(56) References Cited

U.S. PATENT DOCUMENTS

| | | | | |
|---|---|---|---|---|
| 2023/0141637 | A1* | 5/2023 | Wang | H04W 4/08 |
| | | | | 370/329 |
| 2023/0345310 | A1* | 10/2023 | Li | H04W 4/06 |

OTHER PUBLICATIONS

3GPP TR 23.757 V1.2.0 (Nov. 2020) 3rd Generation Partnership Project; Technical Specification Group Services and System Aspects; Study on architectural enhancements for 5G multicast-broadcast services (Release 17), total 293 pages.

3GPP TSG-WG SA2 Meeting #142E e-meeting S2-2009219 "KI#1:Conclusion update", Huawei, HiSilicon, CATT,ZTE, Nokia, Nokia Shanghai-Bell, OPPO,vivo, Elbonia, Nov. 16-20, 2020, total 6 pages.

SA WG2 Meeting #S2-141E S2-2007283 "KI#4, Solution 2 QoS update", Ericsson, Oct. 12-23, 2020, Elbonia, total 5 pages.

3GPP TS 23.502 V16.7.1 (Jan. 2021) 3rd Generation Partnership Project; Technical Specification Group Services and System Aspects; Procedures for the 5G System (5GS); Stage 2 (Release 16), total 597 pages.

3GPP TSG-WG SA2 Meeting #142E e-meeting S2-2009220 "KI#1:Conclusion update", Nokia, Nokia Shanghai-Bell Elbonia, Nov. 16-20, 2020, total 8 pages.

3GPP TS 24.501 V17.1.0 (Dec. 2020) 3rd Generation Partnership Project; Technical Specification Group Core Network and Terminals; Non-Access-Stratum (NAS) protocol for 5G System (5GS); Stage 3;(Release 17), total 746 pages.

3GPP TS 23.503 V16.7.0 (Dec. 2020) 3rd Generation Partnership Project; Technical Specification Group Services and System Aspects; Policy and charging control framework for the 5G System (5GS); Stage 2 (Release 16), total 114 pages.

* cited by examiner

1:Unicast session 1    2:Unicast session 2    3:Unicast session 3

Same data is delivered on the unicast session 1, the
unicast session 2, and the unicast session 3

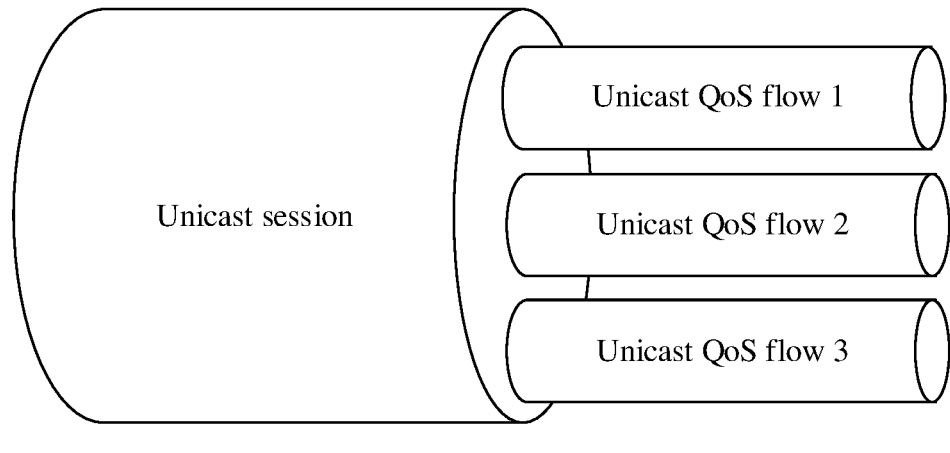
FIG. 4
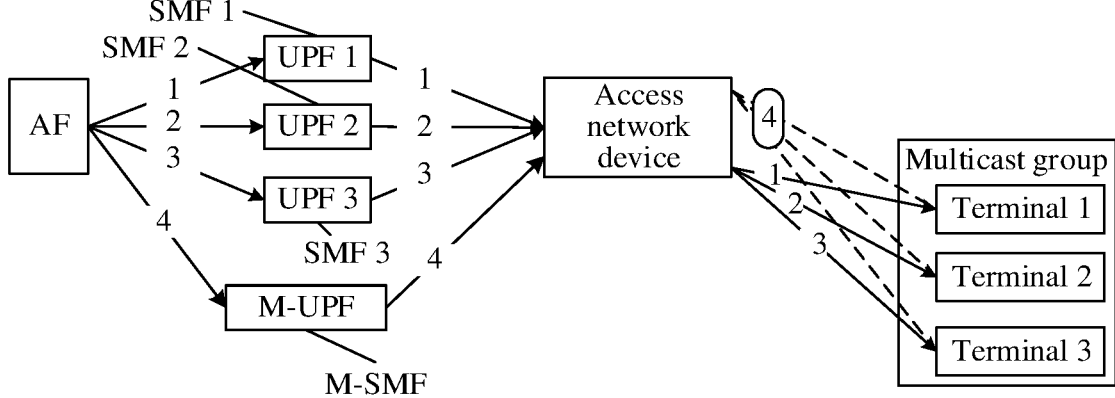
FIG. 5
The unicast session 1, the unicast session 2, and the unicast session 3 are used for delivering unicast data, and the multicast session 4 is used for delivering multicast data
FIG. 6

1: Unicast session    2: Unicast session 2   3: Unicast session 3   4: Multicast session 4

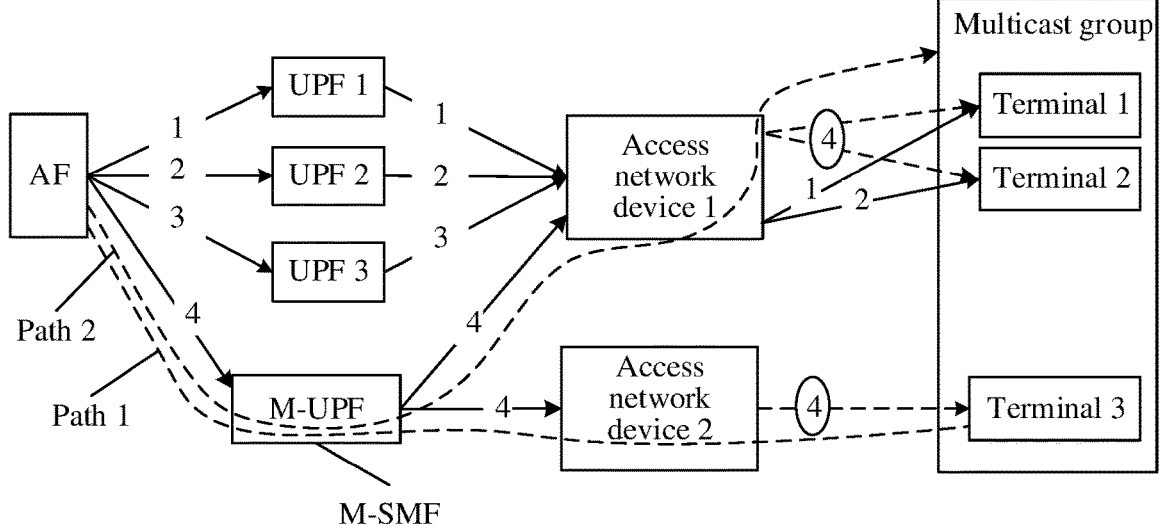

The unicast session 1, the unicast session 2, and the unicast
session 3 are used for delivering unicast data, and the
multicast session 4 is used for delivering multicast data

FIG. 7

1: Unicast session 1   2: Unicast session 2   3: Unicast session 3   4: Multicast session 4

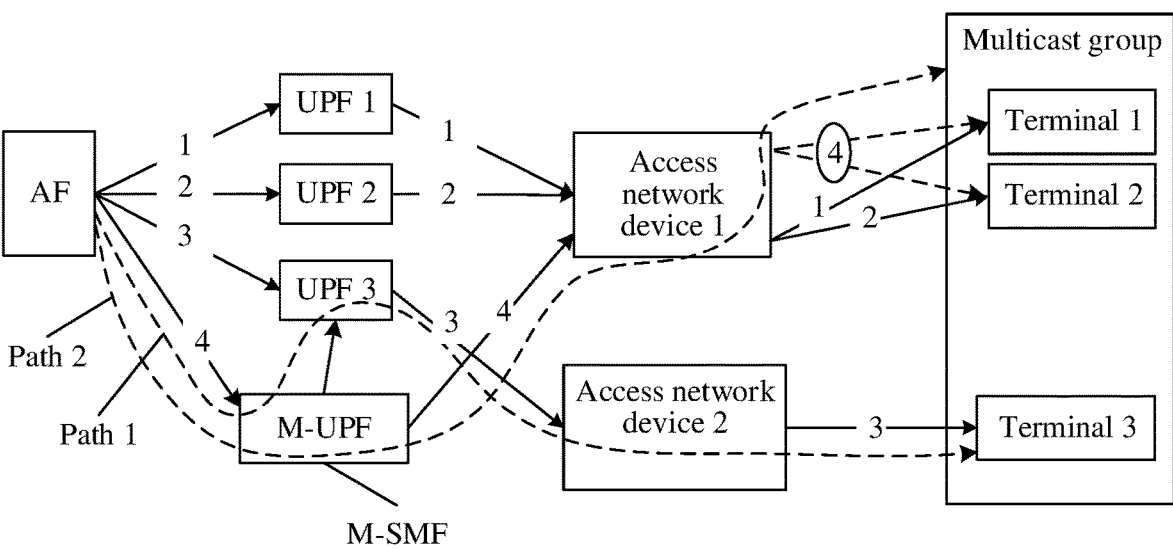

The unicast session 1 and the unicast session 2 are used for delivering unicast
data, the unicast session 3 is used for delivering the unicast data and multicast
data, and the multicast session 4 is used for delivering the multicast data

FIG. 8

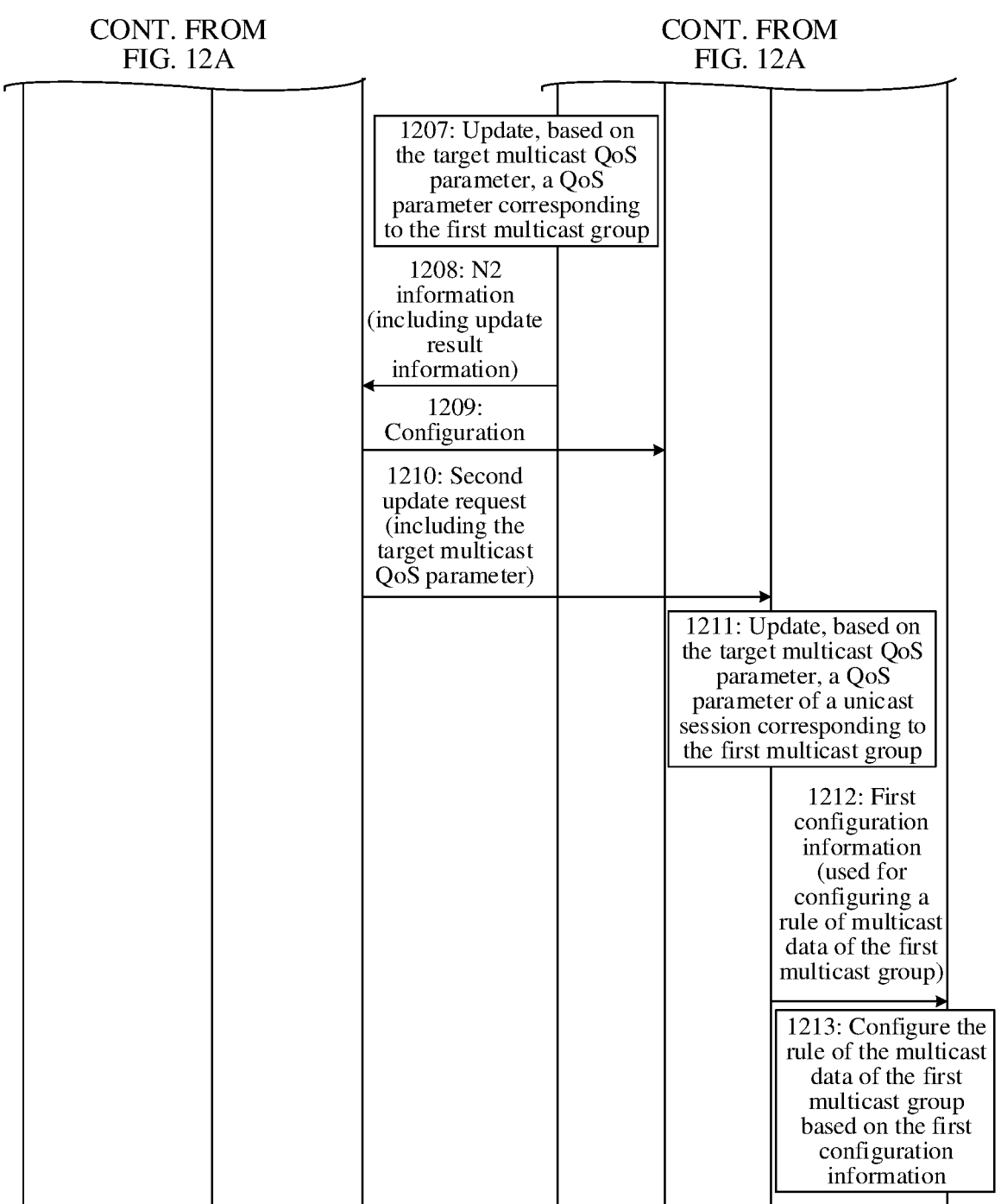

CONT. FROM
FIG. 12A

CONT. FROM
FIG. 12A

1207: Update, based on
the target multicast QoS
parameter, a QoS
parameter corresponding
to the first multicast group 1208: N2
information
(including update
result
information)

1209:
Configuration

1210: Second
update request
(including the
target multicast
QoS parameter)

1211: Update, based on
the target multicast QoS
parameter, a QoS
parameter of a unicast
session corresponding to
the first multicast group 1212: First
configuration
information
(used for
configuring a
rule of multicast
data of the first
multicast group)

1213: Configure the
rule of the multicast
data of the first
multicast group
based on the first
configuration
information

FIG. 12B

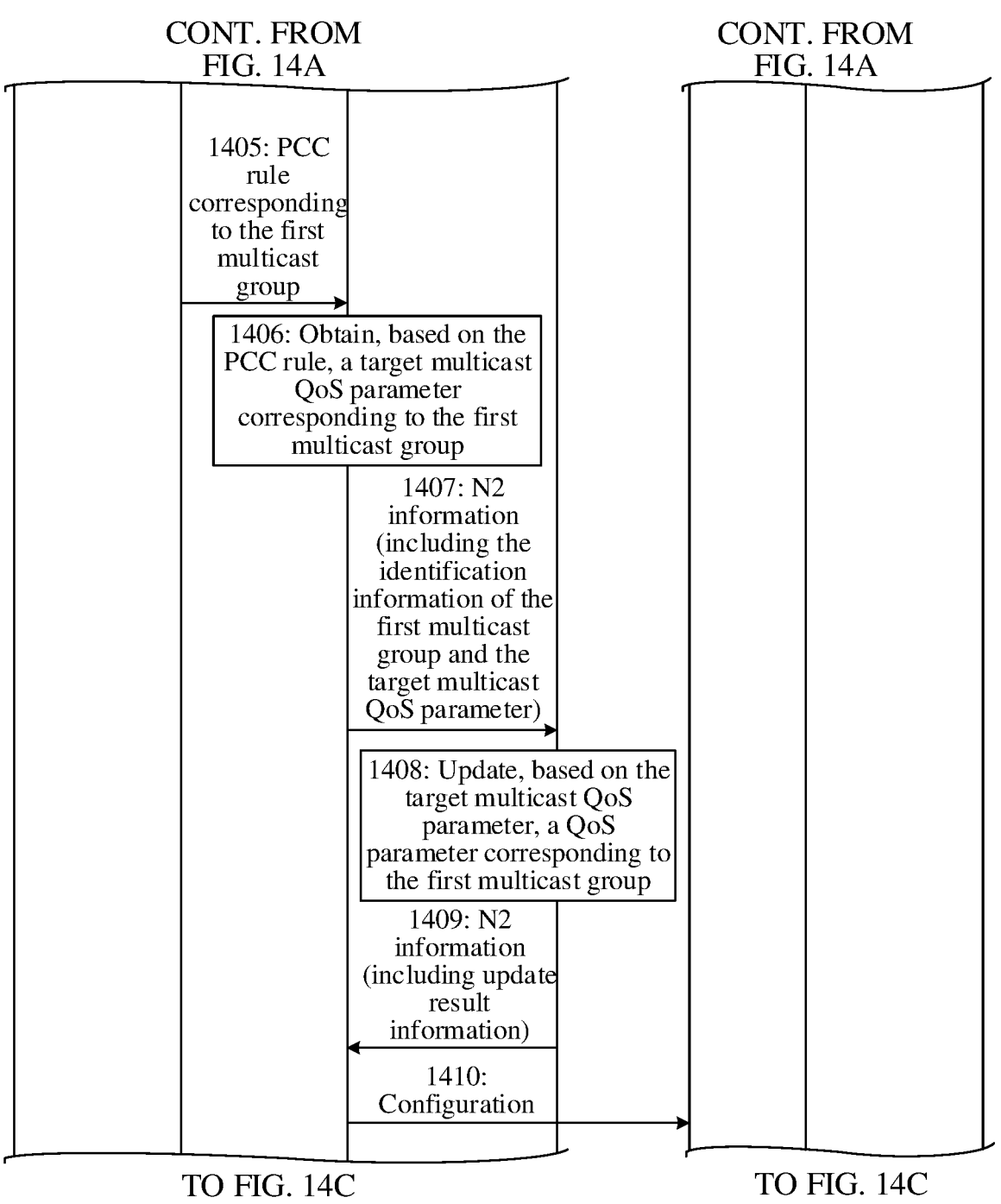

CONT. FROM
FIG. 14A

CONT. FROM
FIG. 14A

1405: PCC
rule
corresponding
to the first
multicast
group

1406: Obtain, based on the
PCC rule, a target multicast
QoS parameter
corresponding to the first
multicast group 1407: N2
information
(including the
identification
information of the
first multicast
group and the
target multicast
QoS parameter)

1408: Update, based on the
target multicast QoS
parameter, a QoS
parameter corresponding to
the first multicast group 1409: N2
information
(including update
result
information)

1410:
Configuration

CONT. FROM
FIG. 15A

CONT. FROM
FIG. 15A

1506: First information
(including the first indication
information and/or second
indication information, where
the first indication information
indicates that the first terminal
leaves the first multicast group,
and the second indication
information indicates to release
an association relationship
between a QoS flow in a unicast
session of the first terminal and
a multicast QoS flow of the first
multicast group)

1507: The access network device performs
one or more of the following operations based
on the first information: (1) deleting context
information of the first terminal that is related
to receiving multicast data of the first
multicast group, that is, deleting a resource
for receiving the multicast data by the first
terminal, for example, deleting a radio bearer
corresponding to the multicast data, to avoid a
waste of resources; (2) deleting information
about the first terminal in the first multicast
group, for example, deleting identification
information of the first terminal in the first
multicast group; or (3) releasing the
association relationship between the QoS flow
in the unicast session of the first terminal and
the multicast QoS flow of the first multicast
group

FIG. 15B

COMMUNICATION METHOD AND APPARATUS FOR CONFIGURING MULTICAST QoS PARAMETER

CROSS-REFERENCE TO RELATED APPLICATIONS

This application is a continuation of International Application No. PCT/CN2022/071897, filed on Jan. 13, 2022, which claims priority to Chinese Patent Application No. 202110162949.1, filed on Feb. 5, 2021. The disclosures of the aforementioned applications are hereby incorporated by reference in their entireties.

TECHNICAL FIELD

This application relates to the communication field, and in particular, to a communication method and apparatus.

BACKGROUND

In a 3rd Generation Partnership Project (3GPP) network, there is a requirement for a network side device (for example, an application function network element) to simultaneously send same data to a plurality of terminals, that is, a point-to-multipoint data delivery requirement.

To meet this requirement, the following solution is usually used in the current technology. Refer to FIG. 1. Each of a plurality of terminals establishes a unicast session (also referred to as a protocol data unit (PDU) session). An application function network element sends data to the terminal via a user plane function (UPF) corresponding to the unicast session established by the terminal. In this manner, the application function network element needs to make a plurality of copies of the data, and sends the data to the plurality of terminals via the UPFs corresponding to the plurality of unicast sessions. Therefore, a large quantity of delivery resources are required.

To save network-side and air interface delivery resources, it is expected that the data sent to the plurality of terminals may share a same UPF and a same access network device, that is, the data is sent to the plurality of terminals via the same UPF and the same access network device. In this case, how to configure a quality of service (QoS) parameter is an urgent problem to be resolved currently.

SUMMARY

Embodiments of this application provide a communication method and apparatus, to resolve a problem of how to configure a QoS parameter in a scenario in which data is sent to a plurality of terminals via a same UPF and a same access network device.

According to a first aspect, a communication method is provided. The communication method includes: A multicast session management function network element receives a PCC rule corresponding to a first multicast group from a policy control function network element; obtains, based on the PCC rule, a target multicast QoS parameter corresponding to the first multicast group; and sends the target multicast QoS parameter to an access network device. The target multicast QoS parameter is used for configuring a QoS parameter corresponding to the first multicast group. According to the method provided in the first aspect, the multicast session management function network element may send the target multicast QoS parameter to the access network device, so that the access network device obtains the target multicast QoS parameter, and configures, based on the target multicast QoS parameter, the QoS parameter corresponding to the first multicast group. In this way, a multicast QoS parameter is configured.

With reference to the first aspect, in a first implementation, before that a multicast session management function network element receives a PCC rule corresponding to a first multicast group from a policy control function network element, the method further includes: The multicast session management function network element receives a first multicast parameter of the first multicast group from an application function network element or an access and mobility management function network element; and sends a second multicast parameter of the first multicast group to the policy control function network element based on the first multicast parameter. The first multicast parameter includes a first multicast QoS parameter and/or multicast service requirement information, and the second multicast parameter is used for generating the PCC rule. In this implementation, a parameter for generating the PCC rule may be provided for the policy control function network element, so that the policy control function network element can generate the PCC rule corresponding to the first multicast group.

With reference to the first implementation of the first aspect, in a second implementation, the first multicast QoS parameter includes at least one of the following: a QoS parameter requested by a terminal or a QoS parameter requested by the application function network element. In this implementation, each network element may configure a multicast QoS parameter based on the QoS parameter requested by the terminal or the application function network element, to meet a multicast service requirement.

With reference to the first aspect or the first or second implementation of the first aspect, in a third implementation, the method further includes: The multicast session management function network element sends the target multicast QoS parameter to a unicast session management function network element corresponding to the first multicast group. In this implementation, the unicast session management function network element may obtain the target multicast QoS parameter, and update a QoS parameter of a unicast session based on the target multicast QoS parameter. In this way, when a channel state of the terminal is poor or an access network device that the terminal is handed over to does not support multicast delivery, multicast data may be sent by switching from a multicast session to the unicast session, to ensure service continuity of the terminal to some extent.

With reference to any one of the first aspect or the first to third implementations of the first aspect, in a fourth implementation, the method further includes: The multicast session management function network element receives member change information of the first multicast group from the application function network element, where the member change information indicates a terminal that leaves the first multicast group; and when the terminal that leaves the first multicast group includes a first terminal, the multicast session management function network element sends, to a first unicast session management function network element, first indication information indicating that the first terminal leaves the first multicast group. The first unicast session management function network element is a unicast session management function network element corresponding to the first terminal in the unicast session management function network element corresponding to the first multicast group. In this implementation, the multicast session management function network element may indicate, to the first unicast session management function network element, the terminal that leaves the first multicast group. In this way, the first unicast session management function network element obtains the information and releases an association relationship between a QoS flow in a unicast session corresponding to the first multicast group and a multicast QoS flow of the first multicast group of the terminal, so that the QoS flow in the unicast session can subsequently be associated with another multicast QoS flow, to improve resource utilization.

According to a second aspect, a communication method is provided. The communication method includes: A unicast session management function network element receives a target multicast QoS parameter corresponding to a first multicast group from a multicast session management function network element; and configures, based on the target multicast QoS parameter, a QoS parameter of a unicast session corresponding to the first multicast group. The target multicast QoS parameter is used for configuring a QoS parameter corresponding to the first multicast group, and the unicast session management function network element is a unicast session management function network element corresponding to the first multicast group. According to the method provided in the second aspect, the unicast session management function network element may obtain the target multicast QoS parameter, and update the QoS parameter of the unicast session based on the target multicast QoS parameter. In this way, when a channel state of a terminal is poor or an access network device that the terminal is handed over to does not support multicast delivery, multicast data may be sent by switching from a multicast session to the unicast session, to ensure service continuity of the terminal to some extent.

With reference to the second aspect, in a first implementation, the method further includes: The unicast session management function network element sends, to a unicast user plane function network element corresponding to the unicast session, configuration information used for configuring a rule of multicast data of the first multicast group. In this implementation, the unicast user plane function network element may obtain the rule, so that the unicast user plane function network element processes and/or delivers, based on the rule, the multicast data of the first multicast group that is received from a multicast user plane function network element. In this way, when the channel state of the terminal is poor or the access network device that the terminal is handed over to does not support the multicast delivery, the multicast data may be sent by switching from the multicast session to the unicast session, to ensure the service continuity of the terminal to some extent.

With reference to the second aspect or the first implementation of the second aspect, in a second implementation, the unicast session management function network element is a unicast session management function network element corresponding to a first terminal, and the method further includes: The unicast session management function network element receives, from the multicast session management function network element, first indication information indicating that the first terminal leaves the first multicast group, and releases an association relationship between a QoS flow in a second unicast session and a multicast QoS flow of the first multicast group based on the first indication information. The second unicast session is a unicast session of the first terminal, and the second unicast session corresponds to the first multicast group. In this implementation, a first unicast session management function network element may learn of a terminal that leaves the first multicast group, and releases the association relationship between the QoS flow in the unicast session corresponding to the first multicast group and the multicast QoS flow of the first multicast group of the terminal, so that the QoS flow in the unicast session can subsequently be associated with another multicast QoS flow, to improve resource utilization.

With reference to the second implementation of the second aspect, in a third implementation, the method further includes: The unicast session management function network element sends first information to an access network device accessed by the first terminal, where the first information includes either or both of the following information: first indication information or second indication information, and the second indication information indicates to release an association relationship between a QoS flow in a unicast session of the first terminal and the multicast QoS flow of the first multicast group. In this implementation, the access network device may obtain information about the terminal that leaves the first multicast group, and update information related to the first multicast group. Therefore, the terminal that leaves the first multicast group does not occupy multicast-related resources, improving resource utilization.

With reference to the second or third implementation of the second aspect, in a fourth implementation, the method further includes: The unicast session management function network element sends a QoS parameter of the second unicast session to an access network device accessed by the first terminal. In this implementation, the access network device may indirectly obtain information about the terminal that leaves the first multicast group, and update information related to the first multicast group. Therefore, the terminal that leaves the first multicast group does not occupy multicast-related resources, improving resource utilization.

With reference to the second aspect or the first to fourth implementations of the second aspect, in a fifth implementation, the method further includes: The unicast session management function network element determines that a delivery mode of a second terminal is an individual delivery mode; and sends a target QoS parameter of a first unicast session to an access network device accessed by the second terminal. The first unicast session is a unicast session of the second terminal, the first unicast session corresponds to the first multicast group, and the second terminal belongs to the first multicast group. In this implementation, the unicast session management function network element may first update the QoS parameter of the unicast session, and then the access network device updates the QoS parameter of the unicast session based on the target QoS parameter of the unicast session that is obtained through update by the unicast session management function network element. This is applicable to a scenario in which the access network device does not support multicast delivery.

According to a third aspect, a communication method is provided. The communication method includes: An access network device receives a target multicast QoS parameter corresponding to a first multicast group from the multicast session management function network element; and configures, based on the target multicast QoS parameter, a QoS parameter corresponding to the first multicast group. According to the method provided in the third aspect, the access network device may obtain the target multicast QoS parameter corresponding to the first multicast group, and configure, based on the target multicast QoS parameter, the QoS parameter corresponding to the first multicast group. In this way, a multicast QoS parameter is configured.

With reference to the third aspect, in a first implementation, the method further includes: The access network device configures a QoS parameter of a first unicast session based on the target multicast QoS parameter. The first unicast session is a unicast session of a second terminal, the first unicast session corresponds to the first multicast group, and the second terminal belongs to the first multicast group. In this implementation, when a QoS parameter of a unicast session is updated, each unicast SMF does not need to send N2 information to the access network device, so that signaling can be reduced.

With reference to the third aspect or the first implementation of the third aspect, in a second implementation, the target multicast QoS parameter includes an ARP.

With reference to the third aspect, in a third implementation, the method further includes: The access network device receives a target QoS parameter of a first unicast session from a second unicast session management function network element; and configures the QoS parameter of the first unicast session based on the target QoS parameter of the first unicast session. The first unicast session is a unicast session of a second terminal, the first unicast session corresponds to the first multicast group, and the second unicast session management function network element is a unicast session management function network element corresponding to the second terminal in a unicast session management function network element corresponding to the first multicast group. In this implementation, the unicast session management function network element may first update the QoS parameter of the unicast session, and then the access network device updates the QoS parameter of the unicast session based on the target QoS parameter of the unicast session that is obtained through update by the unicast session management function network element. This is applicable to a scenario in which the access network device does not support multicast delivery.

With reference to the third aspect or the first to third implementations of the third aspect, in a fourth implementation, the method further includes: The access network device receives first information from a first unicast session management function network element; and performs one or more of the following operations based on the first information: deleting context information of a first terminal that is related to receiving multicast data of the first multicast group; deleting information about a first terminal in the first multicast group; or releasing an association relationship between a QoS flow in a unicast session of a first terminal and a multicast QoS flow of the first multicast group. The first unicast session management function network element is a unicast session management function network element corresponding to the first terminal in the unicast session management function network element corresponding to the first multicast group, the first information includes either or both of the following information: first indication information or second indication information, the first indication information indicates that the first terminal leaves the first multicast group, and the second indication information indicates to release the association relationship between the QoS flow in the unicast session of the first terminal and the multicast QoS flow of the first multicast group. In this implementation, the access network device may obtain information about a terminal that leaves the first multicast group, and update information related to the first multicast group. Therefore, the terminal that leaves the first multicast group does not occupy multicast-related resources, improving resource utilization.

With reference to the third aspect or the first to third implementations of the third aspect, in a fourth implementation, the method further includes: The access network device receives a QoS parameter of a second unicast session from a first unicast session management function network element; and releases an association relationship between a QoS flow in the second unicast session and a multicast QoS flow of the first multicast group based on the QoS parameter of the second unicast session. The second unicast session is a unicast session of a first terminal, the second unicast session corresponds to the first multicast group, and the first unicast session management function network element is a unicast session management function network element corresponding to the first terminal in the unicast session management function network element corresponding to the first multicast group. In this implementation, the access network device may indirectly obtain information about a terminal that leaves the first multicast group, and update information related to the first multicast group. Therefore, the terminal that leaves the first multicast group does not occupy multicast-related resources, improving resource utilization.

According to a fourth aspect, a communication method is provided. The communication method includes: A policy control function network element receives a multicast parameter of a first multicast group; and sends a PCC rule corresponding to the first multicast group to a multicast session management function network element. According to the method provided in the fourth aspect, the policy control function network element may send the PCC rule corresponding to the first multicast group to the multicast session management function network element based on the received multicast parameter, so that the multicast session management function network element may obtain, based on the PCC rule, a target multicast QoS parameter corresponding to the first multicast group.

With reference to the fourth aspect, in a first implementation, that a policy control function network element receives a multicast parameter of a first multicast group includes: The policy control function network element receives a first multicast parameter from an application function network element; or the policy control function network element receives a second multicast parameter from the multicast session management function network element, where the first multicast parameter includes a first multicast QoS parameter and/or multicast service requirement information, and the second multicast parameter is the same as the first multicast parameter or is obtained based on the first multicast parameter. In this implementation, the policy control function network element may obtain the multicast parameter, to generate the PCC rule.

With reference to the fourth aspect or the first implementation of the fourth aspect, in a second implementation, the method further includes: The policy control function network element generates the PCC rule based on the multicast parameter of the first multicast group.

According to a fifth aspect, a communication method is provided. The communication method includes: An application function network element obtains a first multicast parameter of a first multicast group; and sends the first multicast parameter. The first multicast parameter includes a first multicast QoS parameter and/or multicast service requirement information. According to the method provided in the fifth aspect, the application function network element may obtain and send the first multicast parameter, so that another network element may generate a PCC rule based on the first multicast parameter.

With reference to the fifth aspect, in a first implementation, that an application function network element sends the first multicast parameter includes: The application function network element sends the first multicast parameter to a multicast session management function network element; or the application function network element sends the first multicast parameter to a policy control function network element.

With reference to the fifth aspect or the first implementation of the fifth aspect, in a second implementation, the first multicast QoS parameter includes a QoS parameter requested by the application function network element. In this implementation, each network element may configure a multicast QoS parameter based on the QoS parameter requested by the application function network element, to meet a multicast service requirement.

With reference to the fifth aspect or the first or second implementation of the fifth aspect, in a third implementation, the method further includes: The application function network element sends member change information of the first multicast group to the multicast session management function network element, where the member change information of the first multicast group indicates a terminal that leaves the first multicast group. In the implementation, the multicast session management function network element may obtain information about the terminal that leaves the first multicast group, to subsequently update information, related to the first multicast group, about the terminal that leaves the first multicast group. Therefore, the terminal that leaves the first multicast group does not occupy multicast-related resources, improving resource utilization.

According to a sixth aspect, a communication method is provided. The communication method includes: A unicast user plane function network element receives, from a unicast session management function network element, configuration information of a rule used for configuring multicast data of a first multicast group; and configures the rule of the multicast data of the first multicast group based on the configuration information. According to the method provided in the sixth aspect, the unicast user plane function network element may obtain the rule, and process and/or deliver, based on the rule, the multicast data of the first multicast group that is received from a multicast user plane function network element. In this way, when a channel state of a terminal is poor or an access network device that the terminal is handed over to does not support multicast delivery, the multicast data may be sent by switching from a multicast session to a unicast session, to ensure service continuity of the terminal to some extent.

With reference to the sixth aspect, in a first implementation, the rule includes a rule used by the unicast user plane function network element to process and/or deliver the multicast data of the first multicast group that is received from the multicast user plane function network element.

With reference to the first implementation of the sixth aspect, in a second implementation, the rule includes one or more of the following information: a rule used by the unicast user plane function network element to identify the multicast data of the first multicast group that is received from the multicast user plane function network element; a rule used by the unicast user plane function network element to forward the multicast data of the first multicast group that is received from the multicast user plane function network element; and a rule used by the unicast user plane function network element to perform QoS handling on the multicast data of the first multicast group that is received from the multicast user plane function network element.

According to a seventh aspect, a communication method is provided. The communication method includes: An access and mobility management function network element receives a first multicast parameter of a first multicast group from a terminal; and sends the first multicast parameter to a multicast session management function network element corresponding to the first multicast group. The first multicast parameter includes a first multicast QoS parameter and/or multicast service requirement information. According to the method provided in the seventh aspect, the access and mobility management function network element may obtain and send the first multicast parameter, so that another network element may generate a PCC rule based on the first multicast parameter.

With reference to the seventh aspect, in a first implementation, the first multicast QoS parameter includes a QoS parameter requested by the terminal. In this implementation, each network element may configure a multicast QoS parameter based on the QoS parameter requested by the terminal, to meet a multicast service requirement.

With reference to the seventh aspect or the first implementation of the seventh aspect, in a second implementation, the method further includes: The access and mobility management function network element receives identification information of the first multicast group from the terminal; and determines, based on the identification information of the first multicast group, the multicast session management function network element corresponding to the first multicast group.

According to an eighth aspect, a communication apparatus is provided. The communication apparatus includes a communication unit and a processing unit. The communication unit is configured to receive, from a policy control function network element, a PCC rule corresponding to the first multicast group. The processing unit is configured to obtain, based on the PCC rule, a target multicast QoS parameter corresponding to the first multicast group, where the target multicast QoS parameter is used for configuring a QoS parameter corresponding to the first multicast group. The communication unit is further configured to send the target multicast QoS parameter to an access network device.

With reference to the eighth aspect, in a first implementation, the communication unit is further configured to receive a first multicast parameter of the first multicast group from an application function network element or an access and mobility management function network element, where the first multicast parameter includes a first multicast QoS parameter and/or multicast service requirement information. The processing unit is further configured to send a second multicast parameter of the first multicast group to the policy control function network element based on the first multicast parameter by using the communication unit, where the second multicast parameter is used for generating the PCC rule.

With reference to the first implementation of the eighth aspect, in a second implementation, the first multicast QoS parameter includes at least one of the following: a QoS parameter requested by a terminal or a QoS parameter requested by the application function network element.

With reference to the eighth aspect or the first or second implementation of the eighth aspect, in a third implementation, the communication unit is further configured to send the target multicast QoS parameter to a unicast session management function network element corresponding to the first multicast group.

With reference to any one of the eighth aspect or the first to third implementations of the eighth aspect, in a fourth implementation, the communication unit is further configured to receive member change information of the first multicast group from the application function network element, where the member change information indicates a terminal that leaves the first multicast group. When the terminal that leaves the first multicast group includes a first terminal, the communication unit is further configured to send first indication information to a first unicast session management function network element, where the first indication information indicates that the first terminal leaves the first multicast group, and the first unicast session management function network element is a unicast session management function network element corresponding to the first terminal in the unicast session management function network element corresponding to the first multicast group.

According to a ninth aspect, a communication apparatus is provided. The communication apparatus includes a communication unit and a processing unit. The communication unit is configured to receive a target multicast QoS parameter corresponding to a first multicast group from a multicast session management function network element, where the target multicast QoS parameter is used for configuring a QoS parameter corresponding to the first multicast group, and the communication apparatus is a communication apparatus corresponding to the first multicast group. The processing unit is configured to configure, based on the target multicast QoS parameter, a QoS parameter of a unicast session corresponding to the first multicast group.

With reference to the ninth aspect, in a first implementation, the communication unit is further configured to send configuration information to a unicast user plane function network element corresponding to the unicast session, where the configuration information is used for configuring a rule of multicast data of the first multicast group.

With reference to the ninth aspect or the first implementation of the ninth aspect, in a second implementation, the communication apparatus is a communication apparatus corresponding to a first terminal. The communication unit is further configured to receive first indication information from the multicast session management function network element, where the first indication information indicates that the first terminal leaves the first multicast group. The processing unit is further configured to release an association relationship between a QoS flow in a second unicast session and a multicast QoS flow of the first multicast group based on the first indication information, where the second unicast session is a unicast session of the first terminal, and the second unicast session corresponds to the first multicast group.

With reference to the second implementation of the ninth aspect, in a third implementation, the communication unit is further configured to send first information to an access network device accessed by the first terminal, where the first information includes either or both of the following information: first indication information or second indication information, and the second indication information indicates to release an association relationship between a QoS flow in a unicast session of the first terminal and the multicast QoS flow of the first multicast group.

With reference to the second or third implementation of the ninth aspect, in a fourth implementation, the communication unit is further configured to send a QoS parameter of the second unicast session to an access network device accessed by the first terminal.

With reference to the ninth aspect or the first to fourth implementations of the ninth aspect, in a fifth implementation, the processing unit is further configured to determine that a delivery mode of a second terminal is an individual delivery mode, where the second terminal belongs to the first multicast group. The communication unit is further configured to send a target QoS parameter of a first unicast session to an access network device accessed by the second terminal.

nal, where the first unicast session is a unicast session of the second terminal, and the first unicast session corresponds to the first multicast group.

According to a tenth aspect, a communication apparatus is provided. The communication apparatus includes a communication unit and a processing unit. The communication unit is configured to receive a target multicast QoS parameter corresponding to a first multicast group from a multicast session management function network element. The processing unit is configured to configure, based on the target multicast QoS parameter, a QoS parameter corresponding to the first multicast group.

With reference to the tenth aspect, in a first implementation, the processing unit is further configured to configure a QoS parameter of a first unicast session based on the target multicast QoS parameter, where the first unicast session is a unicast session of a second terminal, the first unicast session corresponds to the first multicast group, and the second terminal belongs to the first multicast group.

With reference to the tenth aspect or the first implementation of the tenth aspect, in a second implementation, the target multicast QoS parameter includes an ARP.

With reference to the tenth aspect, in a third implementation, the communication unit is further configured to receive a target QoS parameter of a first unicast session from a second unicast session management function network element, where the first unicast session is a unicast session of a second terminal, the first unicast session corresponds to the first multicast group, and the second unicast session management function network element is a unicast session management function network element corresponding to the second terminal in a unicast session management function network element corresponding to the first multicast group. The processing unit is further configured to configure the QoS parameter of the first unicast session based on the target QoS parameter of the first unicast session.

With reference to the tenth aspect or the first to third implementations of the tenth aspect, in a fourth implementation, the communication unit is further configured to receive first information from a first unicast session management function network element, where the first unicast session management function network element is a unicast session management function network element corresponding to a first terminal in the unicast session management function network element corresponding to the first multicast group, the first information includes either or both of the following information: first indication information or second indication information, the first indication information indicates that the first terminal leaves the first multicast group, and the second indication information indicates to release an association relationship between a QoS flow in a unicast session of the first terminal and a multicast QoS flow of the first multicast group. The processing unit is further configured to perform one or more of the following operations based on the first information: deleting context information of the first terminal that is related to receiving multicast data of the first multicast group; deleting information about the first terminal in the first multicast group; or releasing the association relationship between the QoS flow in the unicast session of the first terminal and the multicast QoS flow of the first multicast group.

With reference to the tenth aspect or the first to third implementations of the tenth aspect, in a fourth implementation, the communication unit is further configured to receive a QoS parameter of a second unicast session from a first unicast session management function network element, where the second unicast session is a unicast session of a first terminal, the second unicast session corresponds to the first multicast group, and the first unicast session management function network element is a unicast session management function network element corresponding to the first terminal in the unicast session management function network element corresponding to the first multicast group. The processing unit is further configured to release an association relationship between a QoS flow in the second unicast session and a multicast QoS flow of the first multicast group based on the QoS parameter of the second unicast session.

According to an eleventh aspect, a communication apparatus is provided. The communication apparatus includes a communication unit and a processing unit. The processing unit is configured to receive a multicast parameter of a first multicast group by using the communication unit. The processing unit is further configured to send a PCC rule corresponding to the first multicast group to a multicast session management function network element based on the multicast parameter by using the communication unit.

With reference to the eleventh aspect, in a first implementation, the processing unit is configured to: receive a first multicast parameter from an application function network element by using the communication unit; or receive a second multicast parameter from the multicast session management function network element by using the communication unit; where the first multicast parameter includes a first multicast QoS parameter and/or multicast service requirement information, and the second multicast parameter is the same as the first multicast parameter or is obtained based on the first multicast parameter.

With reference to the eleventh aspect or the first implementation of the eleventh aspect, in a second implementation, the processing unit is further configured to generate the PCC rule based on the multicast parameter of the first multicast group.

According to a twelfth aspect, a communication apparatus is provided. The communication apparatus includes a communication unit and a processing unit. The processing unit is configured to obtain a first multicast parameter of a first multicast group, where the first multicast parameter includes a first multicast QoS parameter and/or multicast service requirement information. The communication unit is configured to send the first multicast parameter.

With reference to the twelfth aspect, in a first implementation, the communication unit is configured to: send the first multicast parameter to a multicast session management function network element; or send the first multicast parameter to a policy control function network element.

With reference to the twelfth aspect or the first implementation of the twelfth aspect, in a second implementation, the first multicast QoS parameter includes a QoS parameter requested by the communication apparatus.

With reference to the twelfth aspect or the first or second implementation of the twelfth aspect, in a third implementation, the communication unit is further configured to send member change information of the first multicast group to the multicast session management function network element, where the member change information of the first multicast group indicates a terminal that leaves the first multicast group.

According to a thirteenth aspect, a communication apparatus is provided. The communication apparatus includes a communication unit and a processing unit. The communication unit is configured to receive configuration information from a unicast session management function network element, where the configuration information is used for configuring a rule of multicast data of a first multicast group.

The processing unit is configured to configure the rule of the multicast data of the first multicast group based on the configuration information.

With reference to the thirteenth aspect, in a first implementation, the rule includes a rule used by the communication apparatus to process and/or deliver the multicast data of the first multicast group that is received from a multicast user plane function network element.

With reference to the first implementation of the thirteenth aspect, in a second implementation, the rule includes one or more of the following information: a rule used by the communication apparatus to identify the multicast data of the first multicast group that is received from the multicast user plane function network element; a rule used by the communication apparatus to forward the multicast data of the first multicast group that is received from the multicast user plane function network element; and a rule used by the communication apparatus to perform QoS handling on the multicast data of the first multicast group that is received from the multicast user plane function network element.

According to a fourteenth aspect, a communication apparatus is provided. The communication apparatus includes a communication unit and a processing unit. The processing unit is configured to receive a first multicast parameter of a first multicast group from a terminal by using the communication unit, where the first multicast parameter includes a first multicast QoS parameter and/or multicast service requirement information. The processing unit is further configured to send, by using the communication unit, the first multicast parameter to the multicast session management function network element corresponding to the first multicast group.

With reference to the fourteenth aspect, in a first implementation, the first multicast QoS parameter includes a QoS parameter requested by the terminal.

With reference to the fourteenth aspect or the first implementation of the fourteenth aspect, in a second implementation, the processing unit is further configured to receive identification information of the first multicast group from the terminal by using the communication unit. The processing unit is further configured to determine, based on the identification information of the first multicast group, the multicast session management function network element corresponding to the first multicast group.

According to a fifteenth aspect, a communication method is provided. The communication method includes: A multicast session management function network element receives member change information of a first multicast group from an application function network element, where the member change information indicates a terminal that leaves the first multicast group; and when the terminal that leaves the first multicast group includes a first terminal, the multicast session management function network element sends first indication information to a first unicast session management function network element, where the first indication information indicates that the first terminal leaves the first multicast group, and the first unicast session management function network element is a unicast session management function network element corresponding to the first terminal in a unicast session management function network element corresponding to the first multicast group.

According to a sixteenth aspect, a communication method is provided. The communication method includes: An application function network element sends member change information of a first multicast group to a multicast session management function network element or a first unicast session management function network element, where the member change information indicates a terminal that leaves the first multicast group, the terminal that leaves the first multicast group includes a first terminal, and the first unicast session management function network element is a unicast session management function network element corresponding to the first terminal in a unicast session management function network element corresponding to the first multicast group.

According to a seventeenth aspect, a communication method is provided. The communication method includes: A first unicast session management function network element receives first indication information from a multicast session management function network element, where the first indication information indicates that a first terminal leaves a first multicast group; or a first unicast session management function network element receives member change information of a first multicast group from an application function network element, where the member change information indicates a terminal that leaves the first multicast group, and the terminal that leaves the first multicast group includes a first terminal; and the first unicast session management function network element releases an association relationship between a QoS flow in a second unicast session and a multicast QoS flow of the first multicast group based on the first indication information or the member change information of the first multicast group, where the second unicast session is a unicast session of the first terminal, and the second unicast session corresponds to the first multicast group.

With reference to the seventeenth aspect, in a first implementation, the method further includes: The first unicast session management function network element sends first information to an access network device accessed by the first terminal, where the first information includes either or both of the following information: the first indication information or second indication information, where the second indication information indicates to release an association relationship between a QoS flow in a unicast session of the first terminal and the multicast QoS flow of the first multicast group.

With reference to the seventeenth aspect, in a second implementation, the method further includes: The first unicast session management function network element sends a QoS parameter of the second unicast session to an access network device accessed by the first terminal.

According to an eighteenth aspect, a communication method is provided. The communication method includes: An access network device receives first information from a first unicast session management function network element, where the first unicast session management function network element is a unicast session management function network element corresponding to a first terminal in a unicast session management function network element corresponding to a first multicast group, the first information includes either or both of the following information: first indication information or second indication information, the first indication information indicates that the first terminal leaves the first multicast group, and the second indication information indicates to release an association relationship between a QoS flow in a unicast session of the first terminal and a multicast QoS flow of the first multicast group; and the access network device performs one or more of the following operations based on the first information: deleting context information of the first terminal that is related to receiving multicast data of the first multicast group; deleting information about the first terminal in the first multicast group; or releasing the association relationship between the QoS flow in the unicast session of the first terminal and the multicast QoS flow of the first multicast group.

According to a nineteenth aspect, a communication method is provided. The communication method includes: An access network device receives a QoS parameter of a second unicast session from a first unicast session management function network element, where the second unicast session is a unicast session of a first terminal, the second unicast session corresponds to a first multicast group, and the first unicast session management function network element is a unicast session management function network element corresponding to the first terminal in a unicast session management function network element corresponding to the first multicast group; and the access network device releases an association relationship between a QoS flow in the second unicast session and a multicast QoS flow of the first multicast group based on the QoS parameter of the second unicast session.

According to a twentieth aspect, a communication apparatus is provided. The communication apparatus includes a communication unit and a processing unit. The processing unit is configured to receive member change information of a first multicast group from an application function network element by using the communication unit, where the member change information indicates a terminal that leaves the first multicast group. When the terminal that leaves the first multicast group includes a first terminal, the processing unit is further configured to send first indication information to a first unicast session management function network element by using the communication unit, where the first indication information indicates that the first terminal leaves the first multicast group, and the first unicast session management function network element is a unicast session management function network element corresponding to the first terminal in a unicast session management function network element corresponding to the first multicast group.

According to a twenty-first aspect, a communication apparatus is provided. The communication apparatus includes a communication unit and a processing unit. The processing unit is configured to send member change information of a first multicast group to a multicast session management function network element or a first unicast session management function network element by using the communication unit, where the member change information indicates a terminal that leaves the first multicast group, the terminal that leaves the first multicast group includes a first terminal, and the first unicast session management function network element is a unicast session management function network element corresponding to the first terminal in a unicast session management function network element corresponding to the first multicast group.

According to a twenty-second aspect, a communication apparatus is provided. The communication apparatus includes a communication unit and a processing unit. The communication unit is configured to receive first indication information from a multicast session management function network element, where the first indication information indicates that a first terminal leaves a first multicast group; or receive member change information of a first multicast group from an application function network element, where the member change information indicates a terminal that leaves the first multicast group, and the terminal that leaves the first multicast group includes a first terminal. The processing unit is configured to release an association relationship between a QoS flow in a second unicast session and a multicast QoS flow of the first multicast group based on the first indication information or the member change information of the first multicast group, where the second unicast session is a unicast session of the first terminal, and the second unicast session corresponds to the first multicast group.

With reference to the twenty-second aspect, in a first implementation, the communication unit is further configured to send first information to an access network device accessed by the first terminal, where the first information includes either or both of the following information: the first indication information or second indication information, and the second indication information indicates to release an association relationship between a QoS flow in a unicast session of the first terminal and the multicast QoS flow of the first multicast group.

With reference to the twenty-second aspect, in a second implementation, the communication unit is further configured to send a QoS parameter of the second unicast session to an access network device accessed by the first terminal.

According to a twenty-third aspect, a communication apparatus is provided. The communication apparatus includes a communication unit and a processing unit. The communication unit is configured to receive first information from a first unicast session management function network element, where the first unicast session management function network element is a unicast session management function network element corresponding to a first terminal in a unicast session management function network element corresponding to the first multicast group, the first information includes either or both of the following information: first indication information or second indication information, the first indication information indicates that the first terminal leaves the first multicast group, and the second indication information indicates to release an association relationship between a QoS flow in a unicast session of the first terminal and a multicast QoS flow of the first multicast group. The processing unit is configured to perform one or more of the following operations based on the first information: deleting context information of the first terminal that is related to receiving multicast data of the first multicast group; deleting information about the first terminal in the first multicast group; or releasing the association relationship between the QoS flow in the unicast session of the first terminal and the multicast QoS flow of the first multicast group.

According to a twenty-fourth aspect, a communication apparatus is provided. The communication apparatus includes a communication unit and a processing unit. The communication unit is configured to receive a QoS parameter of a second unicast session from a first unicast session management function network element, where the second unicast session is a unicast session of a first terminal, the second unicast session corresponds to a first multicast group, and the first unicast session management function network element is a unicast session management function network element corresponding to the first terminal in a unicast session management function network element corresponding to the first multicast group. The processing unit is configured to release an association relationship between a QoS flow in the second unicast session and a multicast QoS flow of the first multicast group based on the QoS parameter of the second unicast session.

According to a twenty-fifth aspect, a communication apparatus is provided. The communication apparatus includes a processor. The processor is connected to a memory, the memory is configured to store computer executable instructions, and the processor executes the computer executable instructions stored in the memory, to implement any method provided in any one of the first aspect to the seventh aspect and the fifteenth aspect to the nineteenth aspect. For example, the memory and the processor may be integrated, or may be independent components. If the memory and the processor are independent components, the memory may be located in the communication apparatus, or may be located outside the communication apparatus.

In a implementation, the processor includes a logic circuit, and further includes at least one of an input interface and an output interface. For example, the output interface is configured to perform a sending operation in a corresponding method, and the input interface is configured to perform a receiving operation in the corresponding method.

In a implementation, the communication apparatus further includes a communication interface and a communication bus. The processor, the memory, and the communication interface are connected through the communication bus. The communication interface is configured to perform the sending and receiving operations in the corresponding method. The communication interface may also be referred to as a transceiver. Optionally, the communication interface includes at least one of a transmitter and a receiver. In this case, the transmitter is configured to perform the sending operation in the corresponding method, and the receiver is configured to perform the receiving operation in the corresponding method.

In a implementation, the communication apparatus exists in a product form of a chip.

According to a twenty-sixth aspect, a chip is provided. The chip includes a processor and an interface. The processor is coupled to a memory through the interface, and when the processor executes a computer program or instructions in the memory, any method provided in any one of the first aspect to the seventh aspect and the fifteenth aspect to the nineteenth aspect is performed.

According to a twenty-seventh aspect, a computer-readable storage medium is provided. The computer-readable storage medium includes computer executable instructions. When the computer executable instructions are run on a computer, the computer is enabled to perform any method provided in any one of the first aspect to the seventh aspect and the fifteenth aspect to the nineteenth aspect.

According to a twenty-eighth aspect, a computer program product including computer executable instructions is provided. When the computer executable instructions are run on a computer, the computer is enabled to perform any method provided in any one of the first aspect to the seventh aspect and the fifteenth aspect to the nineteenth aspect.

According to a twenty-ninth aspect, a communication system is provided. The communication system includes one or more of the following: a communication apparatus configured to perform any method provided in the first aspect, a communication apparatus configured to perform any method provided in the second aspect, a communication apparatus configured to perform any method provided in the third aspect, a communication apparatus configured to perform any method provided in the fourth aspect, a communication apparatus configured to perform any method provided in the fifth aspect, a communication apparatus configured to perform any method provided in the sixth aspect, or a communication apparatus configured to perform any method provided in the seventh aspect.

According to a thirtieth aspect, a communication system is provided. The communication system includes one or more of the following: a communication apparatus configured to perform any method provided in the fifteenth aspect, a communication apparatus configured to perform any method provided in the sixteenth aspect, a communication apparatus configured to perform any method provided in the seventeenth aspect, or a communication apparatus configured to perform any method in the eighteenth aspect or the nineteenth aspect.

For technical effects achieved by any implementation of the eighth aspect to the thirtieth aspect, refer to technical effects achieved by a corresponding implementation of the first aspect to the seventh aspect. Details are not described herein again.

It should be noted that on a premise that the solutions are not contradictory, the solutions in the foregoing aspects may be combined.

BRIEF DESCRIPTION OF DRAWINGS

FIG. 4 is a schematic diagram of a relationship between a unicast session and a unicast QoS flow;

FIG. 5 is a schematic diagram of a multicast session according to an embodiment of this application;

FIG. 6 is a schematic diagram of coexistence of a multicast session and a unicast session according to an embodiment of this application;

FIG. 7 is a schematic diagram of multicast data delivery according to an embodiment of this application;

FIG. 8 is another schematic diagram of multicast data delivery according to an embodiment of this application;

FIG. 12A and FIG. 12B are a flowchart of another communication method according to an embodiment of this application;

FIG. 14A to FIG. 14C are a flowchart of another communication method according to an embodiment of this application;

FIG. 15A and FIG. 15B are a flowchart of another communication method according to an embodiment of this application;

DESCRIPTION OF EMBODIMENTS

In the descriptions of this application, unless otherwise stated, "I" means "or". For example, A/B may represent A or B. In this specification, "and/or" is merely an association relationship for describing associated objects, and indicates that three relationships may exist. For example, A and/or B may represent three cases: Only A exists, both A and B exist, and only B exists. In the descriptions of this application, unless otherwise stated, "at least one" means one or more, and "a plurality of" means two or more.

In addition, to clearly describe the technical solutions in embodiments of this application, terms such as "first" and "second" are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference.

The technical solutions in embodiments of this application may be applied to a 4th Generation (4G) system, various systems evolved based on the 4G system, a 5th generation (5G) system, and various systems evolved based on the 5G system. The 4G system may also be referred to as an evolved packet system (EPS). A core network (CN) of the 4G system may be referred to as an evolved packet core (EPC), and an access network may be referred to as long term evolution (LTE). A core network of the 5G system may be referred to as a 5GC (5G core), and an access network may be referred to as new radio (NR).

Figure 2:
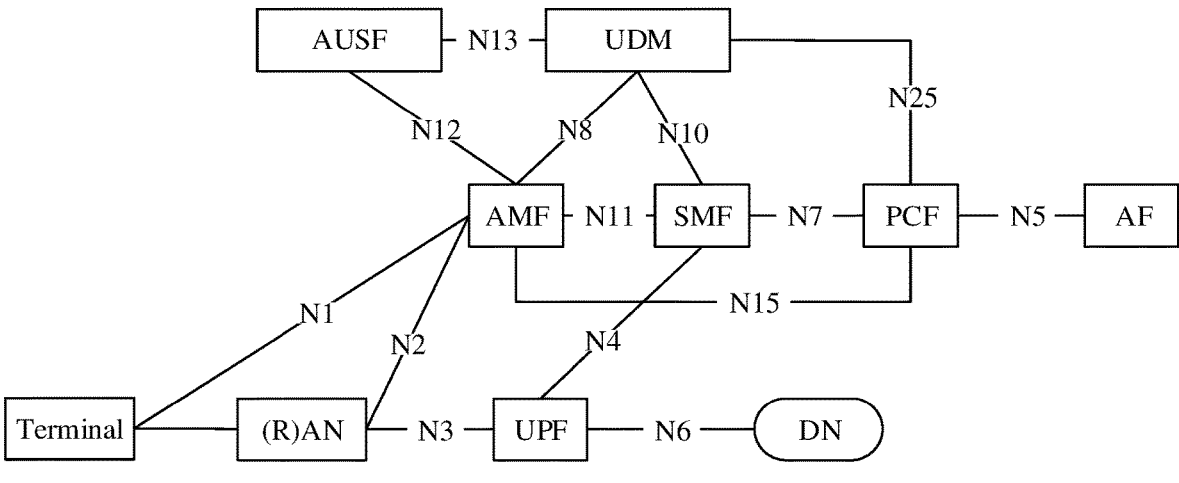
FIG. 2 is a schematic diagram of a network architecture of a 5G system.

FIG. 2 shows an example schematic diagram of a network architecture of a 5G system. In the schematic diagram, the 5G system may include: an authentication server function (AUSF) network element, an access and mobility management function (AMF) network element, a data network (DN), a unified data management (UDM) network element, a policy control function (PCF) network element, a (radio) access network ((R)AN) network element, a UPF network element, a terminal, an application function (AF) network element, and a session management function (SMF) network element.

For ease of description, in the following, the (R)AN network element, the AMF network element, the SMF network element, the UDM network element, the UPF network element, the PCF network element, the AF network element, and the like are respectively indicated by using a RAN, an AMF, an SMF, a UDM, a UPF, a PCF, an AF, and the like.

The 5G system includes an access network and a core network. The access network is configured to implement functions related to radio access, and mainly includes the RAN. The core network is configured to control network services, deliver data, and so on. The core network includes a plurality of network elements, mainly including: the AMF, the SMF, the UPF, the PCF, the UDM, and the like.

Functions of some network elements in FIG. 2 are as follows:

The PCF is responsible for providing policies, such as a QoS policy and a slice selection policy, for the AMF and the SMF.

The UDM is responsible for handling of 3GPP authentication and key agreement (AKA) authentication credentials, and user identification handling, access authorization, registration/mobility management, subscription management, SMS message management, and the like.

The AF may be an application server, and may belong to an operator or a third party. The AF mainly supports interaction with a 3GPP core network to provide service, for example, application influence on traffic routing and a policy control function, or provide some third-party services for a network side.

The AMF is mainly responsible for functions of a signaling processing part, for example, terminal registration management, terminal connection management, terminal reachability management, terminal access authorization and access authentication, a terminal security function, terminal mobility management (such as terminal location update, terminal registration with a network, and terminal handover), network slice selection, SMF selection, and terminal registration or deregistration.

The SMF is mainly responsible for all control plane functions of session management of the terminal, including UPF selection, control, and redirection, internet protocol (IP) address assignment and management, session QoS management, obtaining a policy and charging control (PCC) rule from the PCF, bearer or session establishment, modification, and release, and the like.

The UPF, as an anchor point of a session connection, is responsible for data packet filtering, data delivery/forwarding, rate control, charging information generation, QoS handling for user plane, uplink delivery authentication, delivery class authentication, downlink data packet buffering, downlink data notification triggering, and the like for the terminal.

The RAN is a network including one or more access network devices (which may also be referred to as RAN nodes or network devices), and implements functions such as a radio physical layer function, resource scheduling and radio resource management, a radio access control and mobility management function, quality of service management, and data compression and encryption. The access network device is connected to the UPF via a user plane interface N3, and is configured to deliver data of the terminal. The access network device establishes a control plane signaling connection to the AMF via a control plane interface N2, to implement a function such as radio access bearer control.

The access network device may be a base station, a wireless fidelity (Wi-Fi) access point (AP), a worldwide interoperability for microwave access (WiMAX) site, or the like. The base station may include base stations in various forms, such as a macro base station, a micro base station (also referred to as a small cell), a relay station, and an access point. The base station may be an AP in a wireless local area network (WLAN), a base transceiver station (BTS) in a global system for mobile communications (GSM) or code division multiple access (CDMA), or may be a NodeB (NB) in wideband code division multiple access (WCDMA), or may be an evolved NodeB (eNB, or eNodeB) in LTE, or a relay station or an access point, or an on-board device, a wearable device, a next generation NodeB (gNB) in a future 5G system, a base station in a future evolved public land mobile network (PLMN), or the like.

The terminal may be a wireless terminal, or may be a wired terminal. The wireless terminal may be a device that provides voice and/or data connectivity for a user, a handheld device having a wireless connection function, or another processing device connected to a wireless modem. The wireless terminal may communicate with one or more core network devices via the access network device, for example, communicate with the AMF or the SMF. The wireless terminal may be a mobile terminal, such as a mobile phone (also referred to as a "cellular" phone), a smartphone, a satellite wireless device, a wireless modem card, and a computer with a mobile terminal. For example, the wireless terminal may be a laptop, portable, pocket-sized, handheld, computer built-in, or vehicle-mounted mobile apparatus that exchanges a voice and/or data with the access network device. For example, the wireless terminal may be a device such as a personal communications service (PCS) phone, a cordless phone, a session initiation protocol (SIP) phone, a wireless local loop (WLL) station, a personal digital assistant (PDA), virtual reality (VR) glasses, augmented reality (AR) glasses, a machine-type communication terminal, and an Internet of things terminal. In vehicle-to-everything communication, a communication device loaded on a vehicle is a terminal, and a roadside unit (RSU) may also be used as a terminal. The communication device loaded on a drone may also be considered as a terminal. The wireless terminal may also be referred to as user equipment (UE), a terminal device, a subscriber unit, a subscriber station, a mobile station, a remote station, an access point, an access terminal, a user terminal, a user agent, or the like.

The DN is an operator network that provides a data delivery service for users, for example, an Internet protocol multimedia service (IP multimedia service, IMS) or the Internet.

It may be understood that, in addition to the function network elements shown in FIG. 2, the network architecture of the 5G network may further include other function network elements, for example, a network exposure function (NEF) network element and a network repository function (NRF) network element. In embodiments of this application, the network element may also be referred to as an entity, a device, or the like.

For ease of description, the following uses an example in which network elements in this application are network elements in the 5G system for description of a method provided in this application. It may be understood that the AF in the following may be replaced with an application function network element, the SMF may be replaced with a session management function network element, the PCF may be replaced with a policy control function network element, the AMF may be replaced with an access and mobility management function network element, and the UPF may be replaced with a user plane function network element. The network elements may alternatively be replaced with network elements that have same or similar functions in a 4G system or another communication system for understanding.

To make embodiments of this application clearer, some concepts in this application are first briefly described.

Figure 3:
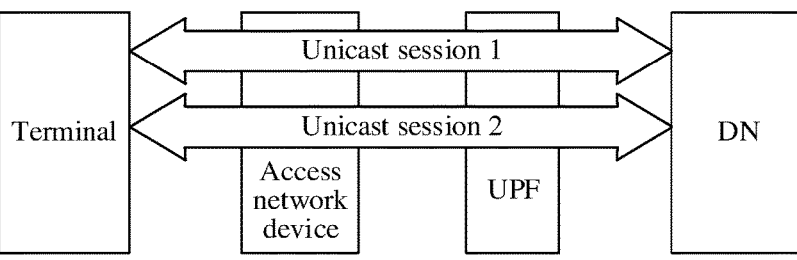
FIG. 3 is a schematic diagram of a unicast session.

1. Unicast Session, Unicast UPF, Unicast SMF, Unicast QoS Parameter, and Unicast QoS Flow In a 5G system, a terminal accesses a DN by establishing a unicast session from the terminal to an access network device, to a UPF, and to the DN. The unicast session may also be referred to as a PDU session. An anchor UPF of the unicast session may be referred to as a unicast UPF, and an SMF that manages the unicast UPF may be referred to as a unicast SMF. The unicast session is a connection between the terminal and the DN and is used for providing a PDU connection service. A type of the unicast session may be an IP connection, an Ethernet connection, an unstructured data connection, or the like. The terminal may initiate one or more unicast sessions to connect to a same DN or different DNs. For example, in FIG. 3, the terminal initiates establishment of a unicast session 1 and a unicast session 2, to connect to a same DN.

A QoS flow in the unicast session may be referred to as a unicast QoS flow. One unicast session may include one or more unicast QoS flows, and one QoS flow identifier (QFI) is used for identifying one unicast QoS flow. The QFI may be dynamically allocated, or may be equal to a 5G QoS flow identifier (5QI). For example, as shown in FIG. 4, one unicast session includes three unicast QoS flows: a unicast QoS flow 1, a unicast QoS flow 2, and a unicast QoS flow 3. Each unicast QoS flow can carry one or more services. In one unicast QoS flow, QoS of different services is the same.

In the 5G system, the unicast QoS flow is controlled by the SMF, and may be preconfigured, or may be established using a unicast session establishment procedure or a unicast session modification procedure. For a same unicast QoS flow, there are QoS parameters (or QoS execution rules, which may be referred to as unicast QoS parameters) of the unicast QoS flow in all of the access network device, the terminal, and the UPF. In the access network device, the unicast QoS parameter may be referred to as a QoS profile. The QoS profile in the access network device may be preconfigured, or may be sent by the SMF to the access network device via an AMF. In the terminal, the unicast QoS parameter may be referred to as a QoS rule. The QoS rule in the terminal may be derived by the terminal by applying reflective QoS control, or may be sent by the SMF to the terminal via the AMF. Optionally, the SMF may further send, to the terminal, QoS parameters associated with these QoS rules (refer to content in 3GPP technical specification (TS) 24.501). In the UPF, the unicast QoS parameter may be referred to as a packet detection rule (PDR). The SMF may provide one or more uplink PDRs and downlink PDRs for the UPF.

2. Multicast session, multicast UPF, multicast SMF, multicast QoS parameter, multicast QoS flow, and multicast data Refer to FIG. 5. In embodiments of this application, an AF may send same data to at least one terminal via a same UPF. The AF sends the data to the UPF, the UPF sends the data to an access network device, the access network device sends the data in a multicast (which may also be referred to as groupcast) or broadcast mode, and at least one terminal receives the data on a specific resource. The UPF may be referred to as a multicast UPF (denoted as an M-UPF), an SMF that manages the M-UPF may be referred to as a multicast SMF (denoted as an M-SMF), and the data may be referred to as multicast data. At least one terminal that receives the multicast data forms a multicast group, and a session that carries the multicast data may be referred to as a multicast session (such as a multicast session 4 in FIG. 5). The multicast data may also be referred to as multicast and broadcast service (MBS) data or an MBS data packet.

Figure 1:
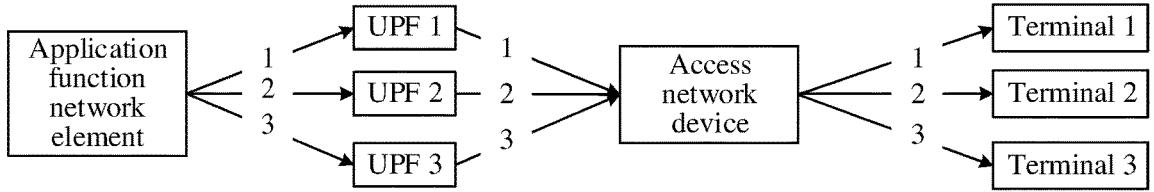
FIG. 1 is a schematic diagram of multicast data delivery.

It should be noted that the multicast data in this application is not data that is necessarily sent in a multicast or broadcast mode, but data that needs to be received by a plurality of terminals or data of a multicast service. For example, for multicast data that needs to be received by a terminal 1, a terminal 2, and a terminal 3, the multicast data may be sent to the terminal 1, the terminal 2, and the terminal 3 via the multicast session 4 in FIG. 5, or may be sent to the terminal 1, the terminal 2, and the terminal 3 respectively via the unicast session 1, the unicast session 2, and the unicast session 3 in FIG. 1. In other words, data sent in a multicast or broadcast mode is multicast data, and data sent via a unicast session may also be multicast data. A core network element (such as the M-SMF) may obtain context information of the multicast group (where for details, refer to first context information of a first multicast group in the following), and notify the access network device, so that the access network device may send, when receiving the multicast data, the multicast data to the terminal in the multicast group.

Similar to the unicast session, the multicast session may also include one or more QoS flows, and the QoS flow in the multicast session may be referred to as a multicast QoS flow. The multicast QoS flow may also have a corresponding identifier. The multicast data may be carried in one or more multicast QoS flows in the multicast session.

Similar to the unicast session, there are also QoS parameters of the multicast QoS flow in the access network device and the M-UPF, and the QoS parameter may be referred to as a multicast QoS parameter.

3. Delivery Mode of a Terminal

Delivery modes of a terminal include a shared delivery mode and an individual delivery mode.

The shared delivery mode is a delivery mode in which an M-UPF sends multicast data to an access network device through a multicast shared channel of a multicast session, and the access network device sends the multicast data to the terminal in a multicast mode. The access network device may send the multicast data to the terminal in a point-to-point mode, that is, one copy of multicast data is sent to a plurality of terminals over an air interface, or the access network device may send the multicast data to the terminal in a point-to-multipoint mode. That is, a plurality of copies of data are sent to the plurality of terminals over the air interface. In the shared delivery mode, a 5GC shares MBS traffic delivery. The 5GC receives a single copy of the multicast data, and delivers the single copy of the multicast data to the access network device.

The individual delivery mode is a delivery mode in which the M-UPF sends multicast data to a unicast UPF, and the unicast UPF sends the multicast data to the terminal via a unicast session. In the individual delivery mode, the 5GC independently delivers MBS traffic. The 5GC receives a single copy of the multicast data and sends the single copy of the multicast data to each terminal via a unicast session of the terminal. Therefore, each terminal is associated with one unicast session.

The foregoing briefly describes some concepts in this application. Based on the understanding of the foregoing concepts, this application needs to resolve the following three problems:

Problem 1: How to Configure a Multicast QoS Parameter

In a communication system shown in FIG. 5, configuration (such as update) of multicast service requirements (such as a bandwidth required for multicast data and a priority for multicast data delivery) may cause a failure in configuration (such as update) of a multicast QoS parameter. If there is a new multicast service requirement but the multicast QoS parameter is not updated, service data delivery may be affected, and problems such as a waste of network resources and a failure to meet a contract requirement of a service may be caused. However, there is no related procedure for configuring the multicast QoS parameter.

Problem 2: How to Configure a QoS Parameter of a Unicast Session Corresponding to a Multicast Group, that is, how to Configure a Unicast QoS Parameter It should be noted that in a process of establishing a multicast session, or before or after establishing a multicast session, each terminal in a multicast group may further establish a unicast session of the terminal. For example, as shown in FIG. 6, for a terminal 1, a terminal 2, and a terminal 3, a core network establishes a unicast session 1, a unicast session 2, and a unicast session 3, respectively. In this case, the unicast session and the multicast session coexist, and different service data may be delivered on the unicast session and the multicast session. For example, for the terminal 1, data of a service 1 of the terminal 1 may be delivered on the unicast session 1, data of a service 2 of the terminal 1 may be delivered on a multicast session 4, and the data of the service 2 is multicast data.

In this case, when a channel state of the terminal is poor or an access network device that the terminal is handed over to does not support multicast delivery, the multicast data may be sent via the unicast session, to ensure service continuity of the terminal to some extent. For one terminal, a multicast session may correspond to one or more unicast sessions of the terminal. In this case, when switching from the multicast session to the unicast session is performed, multicast data delivered on the multicast session is delivered via the corresponding unicast session. A multicast QoS flow in the multicast session may correspond to a unicast QoS flow in the unicast session. In this case, when switching from the multicast session to the unicast session is performed, multicast data delivered on the multicast QoS flow in the multicast session is delivered via the unicast QoS flow in the corresponding unicast session. For one terminal, there may be a one-to-many, many-to-one, or one-to-one correspondence between a multicast QoS flow and a unicast QoS flow. This is not limited in this application. For example, based on the example shown in FIG. 6, Table 1 shows a correspondence between a multicast QoS flow and a unicast QoS flow.

TABLE 1

| Multicast QoS flow in | Unicast QoS flow corresponding to the multicast QoS flow | | |
|---|---|---|---|
| the multicast session 4 | Terminal 1 | Terminal 2 | Terminal 3 |
| Multicast QoS flow 1 | Unicast QoS flow 1 in the unicast session 1 | Unicast QoS flow 1 in the unicast session 2 | Unicast QoS flow 1 in the unicast session 3 |
| Multicast QoS flow 2 | Unicast QoS flow 2 in the unicast session 1 | Unicast QoS flow 2 in the unicast session 2 | Unicast QoS flow 2 in the unicast session 3 |

Refer FIG. 7 and FIG. 8. An access network device accessed by the terminal (for example, the terminal 3) is switched from an access network device 1 to an access network device 2. In this case, as shown in FIG. 7, if the access network device 2 also supports multicast delivery, the access network device may send multicast data to the multicast group via the multicast session 4. The multicast data is sent to the terminal 1 and the terminal 2 in the multicast group through a path 2, and the multicast data is sent to the terminal 3 in the multicast group through a path 1. As shown in FIG. 8, if the access network device 2 does not support multicast delivery, the access network device may send multicast data to the terminal 1 and the terminal 2 in the multicast group via the multicast session 4. The multicast data may be sent to the terminal 1 and the terminal 2 in the multicast group through the path 2, and the multicast data may be sent to the terminal 3 via the unicast session 3. The multicast data is sent to the terminal 3 through the path 1. It can be learned from FIG. 8 that, in this application, when the multicast data is sent to the terminal 3 via the unicast session 3, multicast data received by a UPF 3 is not from an AF, but from an M-UPF.

Because the terminal has a requirement of delivering the multicast data via the unicast session, when a multicast QoS parameter is configured (for example, updated), there is also a requirement of configuring (for example, updating) a QoS parameter of the unicast session corresponding to the multicast group. In this way, when the channel state of the terminal is poor or the access network device that the terminal is handed over to does not support the multicast delivery, the multicast data may be sent via the unicast session, to ensure service continuity of the terminal to some extent.

Problem 3: When the Terminal Leaves the Multicast Group (in Other Words, the Terminal is No Longer a Member of the Multicast Group), a Terminal List Including Members in the Multicast Group Changes. In this Case, how to Configure (for Example, Update) Information Related to the Multicast Group is a Problem.

Figure 9:
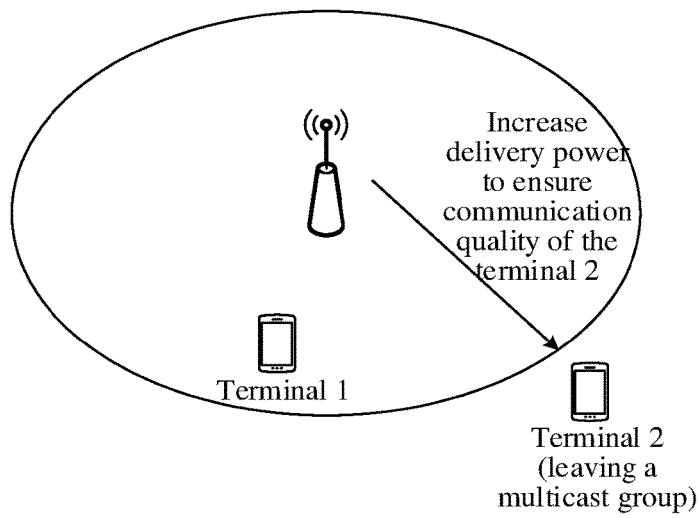
FIG. 9 is a schematic diagram of a communication scenario according to an embodiment of this application.

When subscription information of the terminal changes or the terminal moves, the terminal may leave the multicast group. In this case, a network side does not update the information related to the multicast group. This may cause a waste of resources. For example, as shown in FIG. 9, when the terminal 2 originally belonging to the multicast group leaves the multicast group, if the network side does not update the information related to the multicast group, and the access network device does not learn that the terminal 2 leaves the multicast group, the access network device increases delivery power to ensure communication quality of the terminal 2. Actually, in this case, the access network device does not need to provide a service for the terminal 2, and consequently, a waste of resources is caused. After the terminal leaves the multicast group, the terminal no longer needs to receive the multicast data. A key of the terminal may be changed to make the terminal that leaves the multicast group no longer receive the multicast data. However, in this case, the access network device cannot learn of members in an updated multicast group, and still allocates an additional resource to the terminal that does not belong to the multicast group for data delivery. Therefore, a problem of a waste of resources cannot be resolved.

To resolve the foregoing problems, this application provides a communication method. The method may include a process of configuring a QoS parameter based on a PCC rule. For details, refer to an embodiment shown in FIG. 10. This application further provides another communication method. The method may include a process of configuring information related to a multicast group caused by a terminal that leaves the multicast group. For details, refer to an embodiment shown in FIG. 11.

In the following descriptions, a configuration may be an initial configuration, or may be an update, where the update may also be described as an update of the configuration. A multicast session and a multicast group may be understood in a same manner in some contexts. For example, leaving a multicast group may also be understood as leaving a multicast session, and a unicast session corresponding to the multicast group may also be understood as a unicast session corresponding to the multicast session. When identification information of the multicast group is the same as identification information of the multicast session, the identification information of the multicast group may also be understood as the identification information of the multicast session. When identification information of the multicast group is different from identification information of the multicast session, there is a correspondence between the identification information of the multicast group and the identification information of the multicast session. In the descriptions of this application, "identification information of A" may be an identifier of A, or may be information related to the identifier of A. The term "related" means that the identifier of A may be determined based on the information. For example, the identification information of the multicast group may be an identifier of the multicast group, or may be information related to the identifier of the multicast group. The identifier of the multicast group may be determined based on the information. It should be noted that nouns or terms in embodiments of this application may be mutually referenced. This is not limited.

Figure 10:
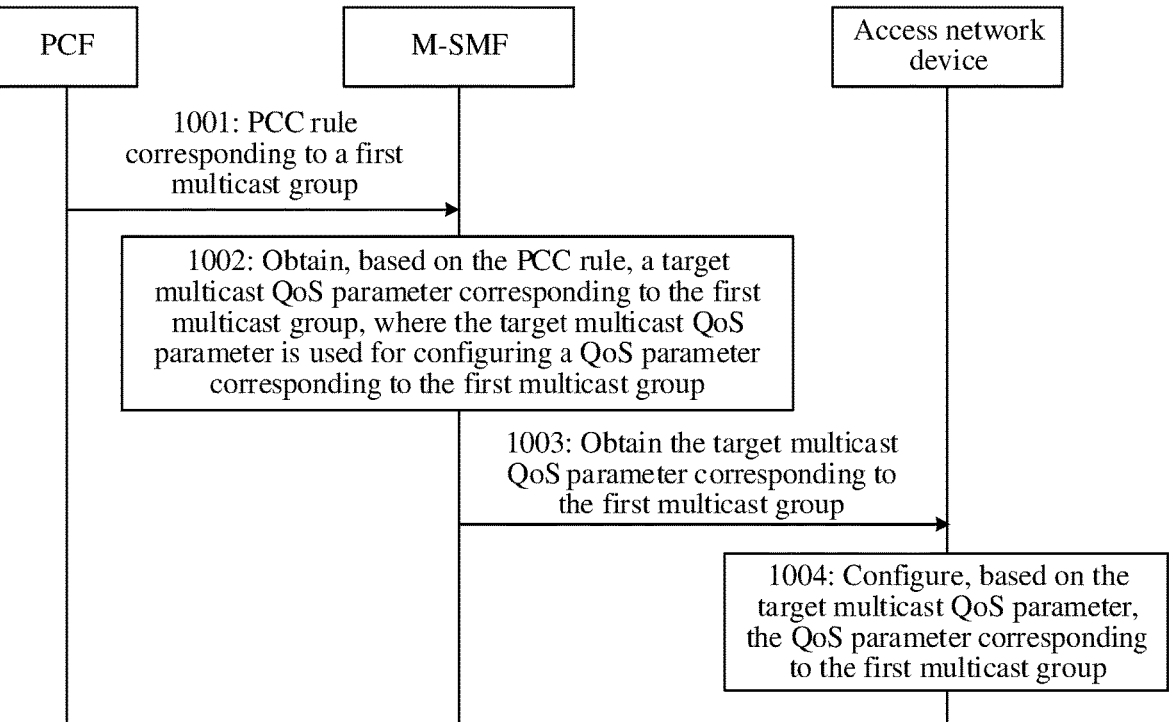
FIG. 10 is a flowchart of a communication method according to an embodiment of this application.

Refer to FIG. 10. A communication method provided in this application includes the following steps.

1001: An M-SMF receives a PCC rule corresponding to a first multicast group from a PCF.

The first multicast group may be a specific multicast group, or may be any multicast group. Terminals in a multicast group may access a same access network device, or may access different access network devices. The terminals in the multicast group receive multicast data via a same multicast session, and receive the multicast data via a same multicast QoS flow in the same multicast session. FIG. 5 is used as an example. The first multicast group may be a multicast group including the terminal 1, the terminal 2, and the terminal 3, the terminals in the first multicast group access a same access network device, and the terminals in the first multicast group receive multicast data via the multicast session 4.

The PCC rule corresponding to the first multicast group may be understood as a PCC rule applied to a multicast session of the first multicast group, or the PCC rule is used for performing policy control (for example, a resource to be used for delivery) and charging on multicast data delivery on a multicast session of the first multicast group.

The PCC rule may include an "authorized QoS parameter" and/or a service data flow template. The "authorized QoS parameter" may include information about a data delivery rate, for example, a maximum flow bit rate (MFBR) of data and a guaranteed flow bit rate (GFBR) of the data. The "authorized QoS parameter" may further include a 5QI, an allocation and retention priority (ARP), an average window size, a maximum data burst size, a session aggregate maximum bit rate, a maximum packet loss rate, or the like. The service data flow template is generated based on a service description. The service data flow template may be, for example, an IP 3-tuple, an IP 5-tuple, or application identification (application id) information.

1002: The M-SMF obtains, based on the PCC rule, a target multicast QoS parameter corresponding to the first multicast group.

The PCC rule can indicate a QoS requirement of a multicast service. The target multicast QoS parameter may be used for configuring a QoS parameter corresponding to the first multicast group.

The target multicast QoS parameter may include one or more of the following information: an ARP, an average window size, a maximum data burst size, data delivery rate information (for example, a GFBR and an MFBR), a session aggregate maximum bit rate, a maximum packet loss rate, and the like.

During implementation of step 1002, the M-SMF may determine parameters in the target multicast QoS parameter based on the PCC rule, or determine parameters in the target multicast QoS parameter and values of these parameters based on the PCC rule. The M-SMF may determine, based on the PCC rule, whether a multicast QoS flow (described as a serving multicast QoS flow in the following) currently serving the first multicast group can meet the QoS requirement of the multicast service, and determine the parameter in the target multicast QoS parameter and a value of the parameter based on a determining result.

In a first case, for the M-SMF, when a multicast QoS parameter of the serving multicast QoS flow includes all parameters in the PCC rule, and a value of each parameter in the multicast QoS parameter of the serving multicast QoS flow is the same as a value of a corresponding parameter in the PCC rule, the serving multicast QoS flow can meet the QoS requirement of the multicast service. In this case, the parameter included in the target multicast QoS parameter is the same as the parameter included in the multicast QoS parameter of the serving multicast QoS flow, and the value of each parameter included in the target multicast QoS parameter is the same as the value of the corresponding parameter in the PCC rule. For example, if the target multicast QoS parameter includes the ARP, a value of the ARP in the target multicast QoS parameter is the same as a value of the ARP in the PCC rule.

In a second case, for the M-SMF, when a QoS requirement indicated by a multicast QoS parameter of the serving multicast QoS flow is higher than the QoS requirement indicated by the PCC rule, the serving multicast QoS flow can meet the QoS requirement of the multicast service. In this case, the parameter included in the target multicast QoS parameter is the same as a parameter included in the multicast QoS parameter of the serving multicast QoS flow, and the value of each parameter included in the target multicast QoS parameter is the same as that of a corresponding parameter in the multicast QoS parameter of the serving multicast QoS flow.

In a third case, for the M-SMF, when differences between values of a small quantity of (for example, one or two) parameters in a multicast QoS parameter of the serving multicast QoS flow and values of corresponding parameters in the PCC rule are small (for example, less than a first threshold), the serving multicast QoS flow can meet the QoS requirement of the multicast service. In this case, the parameter included in target multicast QoS parameter is the same as the parameter included in the multicast QoS parameter of the serving multicast QoS flow, values of a small quantity of parameters are the same as values of corresponding parameters in the PCC rule, and values of other parameters are the same as those of corresponding parameters in the multicast QoS parameter of the serving multicast QoS flow. For example, assuming that the first threshold is 2, if the multicast QoS parameter of the serving multicast QoS flow includes the ARP, the GFBR, and the MFBR, values of the GFBR and the MFBR are respectively the same as values of the GFBR and the MFBR in the PCC rule, and a value of the ARP is less than a value of the ARP in the PCC rule by 1, the M-SMF considers that the serving multicast QoS flow can meet the QoS requirement of the multicast service. In this case, the target multicast QoS parameter includes the ARP, the GFBR, and the MFBR, a value of the ARP in the target multicast QoS parameter is the same as the value of the ARP in the PCC rule, and values of the GFBR and the MFBR in the target multicast QoS parameter are the same as the values of the GFBR and the MFBR in the PCC rule.

If the serving multicast QoS flow does not meet the QoS requirement of the multicast service, the M-SMF may establish a new multicast QoS flow. In this case, the M-SMF may determine a type of the newly established multicast QoS flow based on the PCC rule, and determine, based on the type of the newly established multicast QoS flow, parameters included in a multicast QoS parameter of the newly established multicast QoS flow. Values of these parameters are the same as those of corresponding parameters in the PCC rule. For example, the M-SMF may determine, based on the PCC rule, whether the newly established multicast QoS flow is a QoS flow of a GBR, and if the newly established multicast QoS flow is a QoS flow of a GBR, determine that the multicast QoS parameter of the newly established multicast QoS flow includes the GFBR and the MFBR. Values of the GFBR and the MFBR are respectively the same as the values of the GFBR and the MFBR in the PCC rule.

1003: The M-SMF sends the target multicast QoS parameter corresponding to the first multicast group to an access network device.

Correspondingly, the access network device receives the target multicast QoS parameter from the M-SMF.

The M-SMF may send N2 information to the access network device, where the N2 information includes the target multicast QoS parameter.

The access network device may further obtain identification information of the first multicast group from the M-SMF, to determine a multicast group to which the target multicast QoS parameter corresponds. In an implementation, information in the target multicast QoS parameter may include the identification information of the first multicast group. In another implementation, the identification information of the first multicast group and the target multicast QoS parameter are information independent of each other. In this case, the M-SMF may further send the identification information of the first multicast group to the access network device. In this case, the identification information of the first multicast group and the target multicast QoS parameter may be carried in a same message, or may be carried in different messages. This is not limited in this application.

If the M-SMF establishes a new multicast QoS flow in step 1002, the M-SMF may further send identification information of the newly established multicast QoS flow to the access network device, so that the access network device determines a multicast QoS flow for which the target multicast QoS parameter is configured. The identification information of the newly established multicast QoS flow and the target multicast QoS parameter may be carried in a same message, or may be carried in different messages.

1004: The access network device configures, based on the target multicast QoS parameter, a QoS parameter corresponding to the first multicast group.

For example, if the serving multicast QoS flow is the multicast QoS flow 1 in the multicast session 4, and it is determined, based on the PCC rule, that the serving multicast QoS flow can meet the QoS requirement of the multicast service, during implementation, step 1004 may include: The access network device configures a QoS parameter of the multicast QoS flow 1 in the multicast session 4 as the target multicast QoS parameter.

For another example, if the serving multicast QoS flow is the multicast QoS flow 1 in the multicast session 4, and it is determined, based on the PCC rule, that the serving multicast QoS flow does not meet the QoS requirement of the multicast service, assuming that the M-SMF establishes a new multicast QoS flow 3 in the multicast session 4, the access network device configures a multicast QoS parameter of the multicast QoS flow 3 as the target multicast QoS parameter based on received identification information of the multicast QoS flow 3 and the target multicast QoS parameter.

It should be noted that for the first case and the second case in step 1002, because the multicast QoS parameter in the serving multicast QoS flow does not change, step 1003 and step 1004 may not be performed.

According to the method shown in FIG. 10, the PCF may generate the PCC rule, and each network element may configure the multicast QoS parameter based on the target multicast QoS parameter obtained based on the PCC rule, so that the foregoing problem 1 can be resolved. Problems such as a waste of network resources and a failure to meet a contract requirement of a service can be avoided, and normal delivery of service data is ensured.

Before step 1001, the method may further include the following steps.

(11) The PCF receives a multicast parameter of the first multicast group.

(12) The PCF sends the PCC rule corresponding to the first multicast group to the M-SMF based on the multicast parameter.

An implementation of step (11) includes but is not limited to the following manner 11 or manner 12.

Manner 11: An AF sends a first multicast parameter of the first multicast group to the PCF, where the first multicast parameter includes first multicast QoS parameter and/or multicast service requirement information. Correspondingly, the PCF receives the first multicast parameter of the first multicast group from the AF.

In the manner 11, the AF may directly send the first multicast parameter to the PCF, or may send the first multicast parameter to the PCF via an NEF or another network element.

In the manner 11, the AF may send the first multicast parameter to the PCF when there is a configuration requirement for the multicast QoS parameter and/or the multicast service requirement of the first multicast group. If the AF determines that there is the configuration requirement for the multicast QoS parameter of the first multicast group, the AF may determine that there is the configuration requirement for the multicast QoS parameter of the first multicast group when there is a configuration requirement for a multicast service of the first multicast group. It should be noted that the multicast service in this application is a multicast service performed by the first multicast group, and the multicast data received by the first multicast group is service data of the multicast service.

In the manner 11, the first multicast QoS parameter includes a QoS parameter requested by the AF, and a core network element that receives the first multicast QoS parameter may learn that the first multicast QoS parameter is from the AF.

In the manner 11, the multicast service requirement information may include at least one of the following information: priority information (denoted as first priority information) for sending the multicast data and bandwidth information (denoted as first bandwidth information) required by the multicast data. The bandwidth information in this application may indicate a bandwidth, for example, may be a bandwidth value. The priority information may indicate a priority, for example, may be a priority value. A higher priority value indicates a lower priority.

In the manner 11, in a first case, the first multicast QoS parameter may include at least one of the following information: priority information (denoted as second priority information) for sending the multicast data, and bandwidth information (denoted as second bandwidth information) required by the multicast data. In a second case, the first multicast QoS parameter may include a 5QI. It should be noted that the first multicast QoS parameter may alternatively include both information in the first multicast QoS parameter in the first case and information in the first multicast QoS parameter in the second case.

For the first case of the first multicast QoS parameter, the first multicast QoS parameter may be obtained based on the multicast service requirement information. For example, the second priority information is obtained based on the first priority information, and the second bandwidth information is obtained based on the first bandwidth information. For example, the first multicast QoS parameter may be obtained based on the multicast service requirement information and one or more of the following information: subscription information of the multicast service, a load status of a network element in a current network, and a processing capability of the network element in the current network. The subscription information of the multicast service is used as an example. If the first priority information is 60, and subscribed priority information in the multicast service is 70, the second priority information may be 70, where 60 and 70 are priority values. If a bandwidth indicated by the first bandwidth information is 11 M (megabits) and a subscribed bandwidth in the multicast service is 10 M, the second bandwidth information may be 10 M. The load status of the network element in the current network is used as an example. Load of the network element in the current network is less than (where "less than" may also be replaced with "less than or equal to") a threshold (denoted as the first threshold), a priority indicated by the second priority information may be higher than a priority indicated by the first priority information, and a bandwidth indicated by the second bandwidth information may be greater than the bandwidth indicated by the first bandwidth information. The processing capability of the network element in the current network is used as an example. The processing capability of the network element in the current network is greater than (where "greater than" may also be replaced with "greater than or equal to") a threshold (denoted as a second threshold). The priority indicated by the second priority information may be higher than the priority indicated by the first priority information, and the bandwidth indicated by the second bandwidth information may be greater than the bandwidth indicated by the first bandwidth information. The first threshold and the second threshold may be preconfigured or specified in a protocol. This is not limited in this application.

In the manner 11, the PCF may further obtain the identification information of the first multicast group from the AF, to determine a multicast group to which the first multicast parameter belongs. In an implementation, information in the first multicast parameter may include the identification information of the first multicast group. In another implementation, the identification information of the first multicast group and the first multicast parameter are information independent of each other. In this case, the AF may further send the identification information of the first multicast group to the PCF. In this case, the identification information of the first multicast group and the first multicast parameter may be carried in a same message, or may be carried in different messages. This is not limited in this application.

In this application, identification information of a multicast group may be an identifier of the multicast group, or may be information related to the identifier of the multicast group. The identifier of the multicast group may be an IP address of the multicast group, a temporary multicast group identifier (TMGI) of the multicast group, or the like.

Manner 12: The PCF receives a second multicast parameter of the first multicast group from the M-SMF, where the second multicast parameter is the same as the first multicast parameter or is obtained based on the first multicast parameter, and the second multicast parameter is used for generating the PCC rule. The second multicast parameter may be considered as a multicast parameter in a cellular network.

In the manner 12, the M-SMF may receive the first multicast parameter, and send the second multicast parameter to the PCF based on the first multicast parameter. After the first multicast parameter is received, the first multicast parameter may be directly sent to the PCF as the second multicast parameter, or the second multicast parameter may be obtained based on the first multicast parameter and sent to the PCF. If the second multicast parameter is obtained based on the first multicast parameter and sent to the PCF, when the first multicast parameter is not a 5QI, for example, the second multicast parameter may include at least one of the following information: an ARP obtained by the M-SMF by converting priority information sent in multicast data in the first multicast parameter, and a GFBR of data obtained by the M-SMF by converting bandwidth information in the first multicast parameter. When the first multicast parameter is a 5QI, the second multicast parameter may be information obtained by verifying and correcting the 5QI.

In the manner 12, the PCF may further obtain the identification information of the first multicast group from the M-SMF, to determine a multicast group to which the second multicast parameter belongs. In an implementation, information in the second multicast parameter may include the identification information of the first multicast group. In another implementation, the identification information of the first multicast group and the second multicast parameter are information independent of each other. In this case, the M-SMF may further send the identification information of the first multicast group to the PCF. In this case, the identification information of the first multicast group and the second multicast parameter may be carried in a same message, or may be carried in different messages. This is not limited in this application. For example, both the identification information of the first multicast group and the second multicast parameter may be carried in a session policy request message.

In the manner 12, the M-SMF may obtain the first multicast parameter in the following manner 12.1 or manner 12.2.

Manner 12.1. The AF sends the first multicast parameter to the M-SMF. Correspondingly, the M-SMF receives the first multicast parameter from the AF. The AF may directly send the first multicast parameter to the M-SMF, or may send the first multicast parameter to the M-SMF via the NEF or another network element.

In the manner 12.1, a trigger condition for sending the first multicast parameter to the M-SMF by the AF is the same as a trigger condition for sending the first multicast parameter to the PCF in the manner 11. Refer to the trigger condition for understanding. Details are not described again.

In the manner 12.1, the M-SMF may further obtain the identification information of the first multicast group from the AF, to determine a multicast group to which the first multicast parameter belongs. An implementation process is similar to a process in which the PCF obtains the identification information of the first multicast group from the AF in the manner 11. Refer to the process for understanding. Details are not described again.

Manner 12.2: A terminal sends the first multicast parameter to an AMF, and the AMF receives the first multicast parameter from the terminal, and sends the first multicast parameter to the M-SMF corresponding to the first multicast group.

The terminal may be a terminal in the first multicast group. The first multicast parameter received by the terminal may be sent by the AF to the terminal. The first multicast parameter sent by the AF to the terminal may be carried in an application layer message. The terminal may further obtain the identification information of the first multicast group from the AF, to determine a multicast group to which the first multicast parameter belongs. An implementation process is similar to a process in which the PCF obtains the identification information of the first multicast group from the AF in the manner 11. Refer to the process for understanding. Details are not described again.

In the manner 12.2, the first multicast QoS parameter may include a QoS parameter requested by the terminal. A core network element that receives the first multicast QoS parameter may learn that the first multicast QoS parameter is from the terminal, but cannot learn that the first multicast QoS parameter is sent to the terminal by the AF.

In the manner 12.2, the AMF may further obtain the identification information of the first multicast group, and the AMF determines, based on the identification information of the first multicast group, the M-SMF corresponding to the first multicast group. An implementation process in which the AMF obtains the identification information of the first multicast group is similar to a process in which the PCF obtains the identification information of the first multicast group in the manner 11. Refer to the process for understanding. Details are not described again. For example, the AMF may receive the identification information of the first multicast group from the terminal.

During actual implementation, different multicast groups may be managed by different M-SMFs. There may be a correspondence between identification information of a multicast group and identification information of an M-SMF. In this case, after obtaining the identification information of the first multicast group, the AMF may obtain, based on the correspondence, the M-SMF corresponding to the first multicast group. The correspondence between the identification information of the multicast group and the identification information of the M-SMF in the AMF may be stored in a process of establishing a multicast session. For example, for a correspondence between a multicast group and an M-SMF, refer to Table 2. In Table 2, an example in which identification information of the M-SMF is an identifier of the M-SMF, and identification information of the multicast group is an identifier of the multicast group is used as an example to describe the correspondence between the multicast group and the M-SMF.

TABLE 2

| Identifier of a multicast group | Identifier of an M-SMF |
| --- | --- |
| Identifier of a multicast group 1 | Identifier of an M-SMF 1 |
| Identifier of a multicast group 2 | Identifier of an M-SMF 2 |
| Identifier of a multicast group 3 | Identifier of an M-SMF 3 |

In this application, an identifier of an SMF may be a fully qualified domain name (FQDN) of the SMF, an IP address of the SMF, an SMF instance identifier (SMF instance ID) of the SMF, or the like.

For example, during implementation of step (12), the PCC rule corresponding to the first multicast group may be carried in a multicast session management policy update notification message. For example, if the second multicast parameter sent by the M-SMF to the PCF is carried in a session policy request message, the PCC rule corresponding to the first multicast group may be carried in a session policy response message. The M-SMF may further obtain the identification information of the first multicast group from the PCF, to determine a multicast group to which the PCC rule belongs. In an implementation, information in the PCC rule may include the identification information of the first multicast group. In another implementation, the identification information of the first multicast group and the PCC rule are information independent of each other. In this case, the PCF may further send the identification information of the first multicast group to the M-SMF. In this case, the identification information of the first multicast group and the PCC rule may be carried in a same message, or may be carried in different messages. This is not limited in this application.

Optionally, before step (12), the method further includes: The PCF generates the PCC rule based on the multicast parameter of the first multicast group. For example, the information about the data delivery rate in the PCC rule may be determined based on bandwidth information in the received multicast parameter. It can be learned from the foregoing description that, in some cases, the multicast parameter of the first multicast group may include some parameters in the PCC rule. In this case, after the PCF receives the multicast parameter of the first multicast group, if the multicast parameter of the first multicast group includes some parameters (for example, the GFBR) in the PCC rule, correctness of these parameters may be verified. If the verification fails, these parameters are corrected.

Before the steps in the manner 11 and the manner 12 are performed, the method further includes: The AF obtains the first multicast parameter of the first multicast group. For example, the AF may determine, based on information such as a packet loss rate and a delay that are fed back by the terminal, whether current communication quality meets the multicast service requirement. If not, the AF may determine to configure the multicast service requirement or the multicast QoS parameter. In this case, the AF may obtain the first multicast parameter based on the subscription information of the multicast service.

In the foregoing embodiment, a difference between the first multicast QoS parameter and a second multicast QoS parameter and the target multicast QoS parameter lies in that the first multicast QoS parameter and the second multicast QoS parameter are not authorized and verified by the network, and may not be directly used by the M-SMF (where for example, a request of the AF may be understood only by the PCF). Therefore, the first multicast QoS parameter or the second multicast QoS parameter may be converted into the target multicast QoS parameter.

Optionally, in a first implementation scenario of the embodiment shown in FIG. 10, when the multicast QoS parameter is configured or after the multicast QoS parameter is configured, the access network device configures a QoS parameter of a unicast session corresponding to the multicast group. In other words, the foregoing method may further include: The access network device configures the QoS parameter of the unicast session corresponding to the multicast group. The following describes a process in which the access network device configures the QoS parameter of the unicast session corresponding to the multicast group.

The QoS parameter of the unicast session in the access network device may be implemented in the following manner 21 or manner 22. When the access network device supports multicast delivery, the QoS parameter of the unicast session may be configured in the manner 21 or the manner 22. When the access network device does not support the multicast delivery, the QoS parameter of the unicast session may be configured in the manner 22.

Manner 21: The access network device configures a QoS parameter of a first unicast session based on the target multicast QoS parameter.

In other words, the access network device may configure the QoS parameter of the first unicast session as the target multicast QoS parameter.

The first unicast session may be a unicast session of a second terminal, the first unicast session corresponds to the first multicast group, and the second terminal belongs to the first multicast group.

In an implementation solution of the manner 21, if the serving multicast QoS flow can meet the QoS requirement of the multicast service, the access network device configures, based on the target multicast QoS parameter, a QoS parameter of a unicast QoS flow corresponding to the serving multicast QoS flow in the first unicast session as the target multicast QoS parameter.

For example, based on the example shown in Table 1, if the serving multicast QoS flow is the multicast QoS flow 1 in the multicast session 4 and the second terminal is the terminal 2, the first unicast session is the unicast session 2. In this case, because the multicast QoS flow 1 in the multicast session 4 specifically corresponds to the unicast QoS flow 1 in the unicast session 2, the access network device configures a QoS parameter of the unicast QoS flow 1 in the unicast session 2 as the target multicast QoS parameter.

It should be noted that one terminal may have a plurality of unicast sessions. Some unicast sessions correspond to the first multicast group, and some unicast sessions do not correspond to the first multicast group. That one unicast session of one terminal corresponds to the first multicast group means that the terminal requests to join the first multicast group via a control plane message of the unicast session. In a subsequent process, if the terminal moves to an access network device that does not support multicast delivery, the unicast session may be used to receive multicast data. If the terminal requests to join the first multicast group via the control plane message of the unicast session, and/or when the terminal moves to the access network device that does not support multicast delivery, the terminal receives the multicast data via the unicast session, and it is considered that the unicast session corresponds to a multicast session. A correspondence between the unicast session and the first multicast group may be a correspondence between identification information of the unicast session and the identification information of the first multicast group.

In another implementation solution of the manner 21, the access network device may configure a QoS parameter (for example, a QoS profile) of a unicast session, corresponding to the first multicast group, of each terminal in the first multicast group as the target multicast QoS parameter. The access network device may store a correspondence between identification information of a multicast group, information about a terminal (for example, identification information of the terminal) in the multicast group, and information about a unicast QoS flow (for example, a QFI of the unicast QoS flow) in a unicast session, corresponding to the identification information of the multicast group, of each terminal. In this case, the access network device may determine the terminal in the multicast group based on the identification information of the multicast group, and then determine the unicast QoS flow in the unicast session, corresponding to the identification information of the multicast group, of each terminal, and configure a QoS parameter of the unicast QoS flow. The identifier of the terminal may be information such as a subscription permanent identifier (SUPI), a globally unique temporary UE identifier (GUTI), a generic public subscription identifier (GPSI), or a 5G S-temporary mobile subscription identifier.

It should be noted that in the current technology, to configure a QoS parameter of a unicast session, each unicast SMF needs to send N2 information to an access network device. This increases signaling overheads. However, in this application, the M-SMF may send, to the access network device, the N2 information including the target multicast QoS parameter. In other words, when configuring the multicast QoS parameter in the access network device, the M-SMF also configures the QoS parameter of the unicast session. In this case, the M-SMF only needs to send one piece of N2 information to the access network device, so that signaling can be saved.

In the manner 21, the target multicast QoS parameter of the access network device may be received from the M-SMF, or may be received from a unicast SMF. For example, when the unicast SMF obtains the target multicast QoS parameter, the unicast SMF sends N2 information to the access network device. The N2 information may include the identification information of the multicast group and the target multicast QoS parameter.

Manner 22: The access network device receives the target QoS parameter of the first unicast session from a second unicast SMF, and configures the QoS parameter of the first unicast session based on the target QoS parameter of the first unicast session.

The QoS parameter of the first unicast session may be configured as the target QoS parameter of the first unicast session.

In the manner 22, the first unicast session is a unicast session of a second terminal, the first unicast session corresponds to the first multicast group, the second unicast SMF is a unicast SMF corresponding to the second terminal in unicast SMFs corresponding to the first multicast group, and the access network device is an access network device accessed by the second terminal.

In the manner 22, the method may further include: The second unicast SMF determines that a delivery mode of the second terminal is an individual delivery mode, and the second unicast SMF sends the target QoS parameter of the first unicast session to the access network device accessed by the second terminal.

Before the second unicast SMF determines that the delivery mode of the second terminal is the individual delivery mode, the method may further include: The second unicast SMF obtains a delivery mode of at least one terminal.

The at least one terminal may be a terminal that is served by the second unicast SMF and that is in the first multicast group.

The second unicast SMF may store a delivery mode of each of the at least one terminal, and/or store a parameter (for example, at least one of a rule (1), a rule (2), and a rule (3) in the following, or other rules or parameters required for individual delivery) of a terminal whose delivery mode is the individual delivery mode in the at least one terminal. The second unicast SMF may determine, based on the information, whether the delivery mode of the terminal is the individual delivery mode. For example, if a delivery mode of the terminal 1 stored in the second unicast SMF is the individual delivery mode, or a parameter, used for the individual delivery, of the terminal 1 is stored in the second unicast SMF, it is determined that the delivery mode of the terminal 1 is the individual delivery mode.

In the manner 21 and the manner 22, the QoS parameter of the unicast session corresponding to the first multicast group is configured to implement switching from the multicast session to the unicast session to send multicast data when a channel state of the terminal is poor or an access network device that the terminal is handed over to does not support multicast delivery, to ensure service continuity of the terminal to some extent.

Optionally, in a second implementation scenario of the embodiment shown in FIG. 10, when the multicast QoS parameter is configured or after the multicast QoS parameter is configured, a unicast SMF configures a QoS parameter of a unicast session corresponding to the multicast group. In other words, the method may further include: The unicast SMF configures the QoS parameter of the unicast session corresponding to the multicast group. The following describes a process in which the unicast SMF configures the QoS parameter of the unicast session corresponding to the multicast group.

In the second implementation scenario, the method further includes: The M-SMF sends the target multicast QoS parameter to a unicast SMF corresponding to the first multicast group; the unicast SMF receives the target multicast QoS parameter corresponding to the first multicast group from the M-SMF; and the unicast SMF configures, based on the target multicast QoS parameter, the QoS parameter of the unicast session corresponding to the first multicast group.

The unicast SMF corresponding to the first multicast group may be a unicast SMF that serves a terminal in the first multicast group.

For example, there may be a plurality of unicast SMFs corresponding to the first multicast group. The M-SMF may send the target multicast QoS parameter to each unicast SMF. After receiving the target multicast QoS parameter, each unicast SMF determines, based on the target multicast QoS parameter, a QoS parameter of a unicast session, corresponding to the first multicast group, of a terminal that is served by the unicast SMF and that belongs to the first multicast group. For example, the QoS parameter of the unicast session, corresponding to the first multicast group, of the terminal that is served by the unicast SMF and that belongs to the first multicast group is configured as the target multicast QoS parameter.

It should be noted that if the M-SMF determines, based on the PCC rule, that the serving multicast QoS flow does not meet the QoS requirement of the multicast service, and a new multicast QoS flow is established, the M-SMF sends the target multicast QoS parameter to the unicast SMF corresponding to the first multicast group. Correspondingly, after the unicast SMF receives, from the M-SMF, the target multicast QoS parameter corresponding to the first multicast group, for each terminal that is served by the unicast SMF and that belongs to the first multicast group, the unicast SMF may select a unicast QoS flow or establish a new unicast QoS flow to correspond to the newly established multicast QoS flow, and determine a QoS parameter of the unicast QoS flow based on the target multicast QoS parameter. For example, a unicast QoS parameter of the unicast QoS flow is configured as the target multicast QoS parameter. The unicast SMF may further add information about the newly established multicast QoS flow to information about the unicast QoS flow. Further, the unicast SMF may further send a correspondence between the unicast QoS flow and the multicast QoS flow to the access network device, so that the access network device learns of the correspondence.

For related descriptions of the information about the unicast QoS flow and the information about the multicast QoS flow, refer to the following descriptions.

The unicast SMF corresponding to the first multicast group may further obtain the identification information of the first multicast group from the M-SMF, to determine a multicast group to which the target multicast QoS parameter corresponds. In an implementation, the information in the target multicast QoS parameter may include the identification information of the first multicast group. In another implementation, the identification information of the first multicast group and the target multicast QoS parameter are information independent of each other. In this case, the M-SMF may further send the identification information of the first multicast group to the unicast SMF corresponding to the first multicast group. In this case, the identification information of the first multicast group and the target multicast QoS parameter may be carried in a same message, or may be carried in different messages. This is not limited in this application.

Optionally, the M-SMF sends identification information of a terminal to the unicast SMF corresponding to the first multicast group, so that the unicast SMF determines a specific terminal or specific terminals for which a QoS parameter of a unicast session is configured.

For each terminal, when the terminal needs to receive multicast data, the terminal may trigger a procedure of joining a multicast group. In a process in which the terminal joins the multicast group, the M-SMF stores information about a terminal joining the multicast group and information about a unicast SMF corresponding to the terminal, and configure context information of the multicast group (denoted as first context information of the multicast group). For example, identification information of the terminal joining the multicast group and identification information of the unicast SMF corresponding to the terminal are added to the first context information of the multicast group.

The first context information of the multicast group may include at least one of the following information: identification information of the multicast group, identification information of a terminal in the multicast group, and identification information of a unicast SMF corresponding to the terminal in the multicast group. In other words, the M-SMF may obtain the first context information of the multicast group based on the identification information of the multicast group, and may determine, based on the first context information of the multicast group, the terminal in the multicast group and the unicast SMF corresponding to the terminal in the multicast group.

For example, for an example of the first context information of the multicast group, refer to Table 3. For another example of the first context information of the multicast group, refer to Table 4. In Table 3 and Table 4, the first context information of the multicast group is shown by using an example in which the identification information of the terminal is an identifier of the terminal, identification information of an SMF is an identifier of the SMF, and the identification information of the multicast group is an identifier of the multicast group.

TABLE 3

| Identifier of a multicast group | Identifier of a terminal | Identifier of a unicast SMF corresponding to the terminal |
| --- | --- | --- |
| Identifier of a multicast group 1 | Identifier of a terminal 1 | Identifier of an SMF 1 |

TABLE 3-continued

| Identifier of a multicast group | Identifier of a terminal | Identifier of a unicast SMF corresponding to the terminal |
|---|---|---|
| | Identifier of a terminal 2 | Identifier of an SMF 2 |
| | Identifier of a terminal 3 | Identifier of an SMF 2 |

TABLE 4

| Identifier of a multicast group | Identifier of a unicast SMF corresponding to the multicast group |
|---|---|
| Identifier of a multicast group 1 | Identifier of an SMF 1 Identifier of an SMF 2 |

It should be noted that in the current technology, to configure the QoS parameter of the unicast session, corresponding to the multicast group, of each terminal, the AF needs to send, to each unicast SMF, N2 information used for configuring the QoS parameter of the unicast session. However, in this embodiment of this application, the AF may send the target multicast QoS parameter to the M-SMF only once, and the M-SMF may send the target multicast QoS parameter to each unicast SMF, to reduce signaling overheads of the AF.

Optionally, in a third implementation scenario of the embodiment shown in FIG. 10, the method further includes: The unicast SMF sends configuration information (denoted as first configuration information) to a unicast UPF corresponding to the unicast session, where the first configuration information is used for configuring a rule of multicast data of the first multicast group.

Correspondingly, the unicast UPF receives the first configuration information from the unicast SMF, and configures the rule of the multicast data of the first multicast group based on the first configuration information.

The first configuration information may include one or more of a PDR, a forwarding action rule (FAR), and a quality of service enforcement rule (QER). The unicast session may be a unicast session corresponding to the first multicast group. The unicast UPF corresponding to the unicast session is an anchor UPF of the unicast session.

Optionally, the rule includes a rule used by the unicast UPF to process and/or deliver the multicast data of the first multicast group that is received from an M-UPF. The rule may include one or more of the following information:

(1) a rule used by the unicast UPF to identify the multicast data of the first multicast group that is received from the M-UPF, where for example, the rule may be the PDR, and the PDR includes at least one of core network tunnel information (CN tunnel info), a network instance, a QFI, an IP packet filter set, an application identifier, and the like;

(2) a rule used by the unicast UPF to forward the multicast data of the first multicast group that is received from the M-UPF, where for example, the rule may be the FAR, the FAR may include forwarding operation information, forwarding target information, and the like, and the FAR is used for performing processing related to an N3 or N9 channel (for example, attaching an N3 or N9 header), forwarding a related data packet to the SMF or an application server in a data network, forwarding data to a data network identified by specified data network identification information, or the like; and (3) a rule used by the unicast UPF to perform QoS handling on the multicast data of the first multicast group that is received from the M-UPF, where for example, the rule may be the QER, and the QER may include at least one piece of information such as a maximum bit rate, a guaranteed bit rate, and a filtering rule.

The rule (1) and the rule (2) are used by the unicast UPF to deliver the multicast data of the first multicast group that is received from the M-UPF, and the rule (3) is used by the unicast UPF to process the multicast data of the first multicast group that is received from the M-UPF. After the unicast UPF receives the multicast data from the M-UPF, the unicast UPF may send the multicast data to the access network device, and the access network device sends the multicast data to the terminal. It should be noted that when the channel state of the terminal is poor or the access network device that the terminal is handed over to does not support the multicast delivery, the access network device switches from the multicast session to the unicast session to send the multicast data. In this case, the unicast UPF receives the multicast data from the M-UPF and then sends the multicast data to the terminal via the access network device. Therefore, the foregoing rule can ensure that the unicast UPF smoothly receives the multicast data from the M-UPF and processes the multicast data.

In addition, during handover of the terminal in the first multicast group, the access network device that the terminal is handed over to may reconfigure, for the terminal, a resource for receiving the multicast data, so that the terminal successfully receives the multicast data after the handover.

Figure 11:
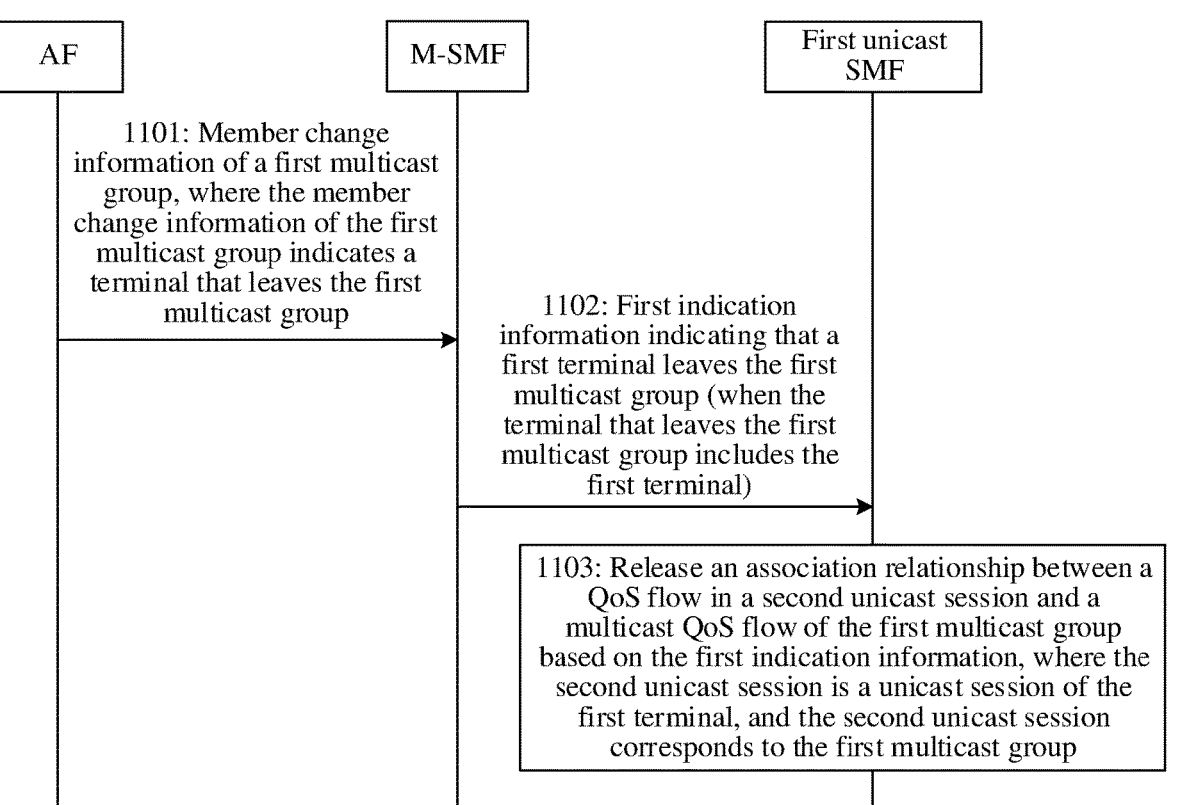
FIG. 11 is a flowchart of another communication method according to an embodiment of this application.

Refer to FIG. 11. Another communication method provided in this application includes the following steps.

1101: An AF sends member change information of a first multicast group to an M-SMF.

The member change information of the first multicast group indicates a terminal that leaves the first multicast group. The member change information of the first multicast group includes an identifier of the terminal that leaves the first multicast group.

The member change information of the first multicast group may be carried in messages such as a multicast session request, a session start request, and an activate MBS bearer request.

Correspondingly, the M-SMF receives the member change information of the first multicast group from the AF.

During implementation of step 1101, when the terminal leaves the first multicast group, the AF may send the member change information of the first multicast group to the M-SMF. The member change information may be, for example, information about the terminal that leaves the first multicast group or information about a changed first multicast group. If the member change information is the information about the changed first multicast group, the M-SMF may determine, based on information about a first multicast group that is not changed and the information about the changed first multicast group, terminals that leave the first multicast group.

During implementation of step 1101, the AF may send identification information and the member change information of the first multicast group to the M-SMF, so that the M-SMF determines terminals in the first multicast group that leave the first multicast group. For descriptions about the identification information of the first multicast group, refer to related descriptions in the embodiment shown in FIG. 10. Details are not described again.

The AF may directly send the member change information of the first multicast group to the M-SMF, or may send the member change information of the first multicast group to the M-SMF via an NEF or another network element.

1102: When the terminal that leaves the first multicast group includes a first terminal, the M-SMF sends first indication information to a first unicast SMF.

The first indication information indicates that the first terminal leaves the first multicast group. Correspondingly, the first unicast SMF receives the first indication information from the M-SMF.

The first unicast SMF is a unicast SMF corresponding to the first terminal in a unicast SMF corresponding to the first multicast group.

The first indication information may include the identification information of the first multicast group and identification information of the first terminal.

For descriptions of the identification information of the terminal, refer to related descriptions in the embodiment shown in FIG. 10. Details are not described again.

In an example, the first indication information may explicitly indicate that the first terminal leaves the first multicast group. For example, the first indication information further includes an information element indicating that the terminal leaves the first multicast group. In another example, the first indication information may implicitly indicate that the first terminal leaves the first multicast group. For example, a message type of a message carrying the first indication information indicates that the first terminal leaves the first multicast group; or the unicast SMF is indicated to release an association relationship between a QoS flow in a unicast session and a multicast QoS flow of a multicast group to indicate that the first terminal leaves the first multicast group. In a third case, currently, identification information of a terminal is generally provided by the unicast SMF for another network element. Therefore, if identification information of one terminal is provided by the M-SMF for the unicast SMF, the unicast SMF may consider that the terminal leaves a multicast group.

Before step 1102, the M-SMF may determine, based on stored first context information of the first multicast group, information about the unicast SMF corresponding to the terminal in the first multicast group. For descriptions of the first context information of the first multicast group, refer to related descriptions in the embodiment shown in FIG. 10. Details are not described again.

In step 1102, the first indication information may be carried in a message sent by the M-SMF to the first unicast SMF, and the message sent by the M-SMF to the first unicast SMF may be a message on an existing N16 interface, such as a PDU session update request message (Nsmf_PDUSession_Update Request) or a message based on another interface, for example, a message on a newly defined interface. This is not limited in this application.

1103: The first unicast SMF releases an association relationship between a QoS flow in a second unicast session and a multicast QoS flow of the first multicast group based on the first indication information.

The second unicast session is a unicast session of the first terminal, and the second unicast session corresponds to the first multicast group.

The association relationship in this application may also be referred to as a mapping relationship or a correspondence.

"Release" in this application may also be replaced with "cancel", "delete", or the like. "An association relationship between a QoS flow in a second unicast session and a multicast QoS flow in the first multicast group" may also be replaced with "information about a multicast QoS flow in the first multicast group that is associated with a QoS flow in a second unicast session".

It should be noted that the unicast SMF stores a correspondence between information about a unicast QoS flow and information about a multicast QoS flow. If a terminal leaves the first multicast group, a unicast SMF serving the terminal may delete information about a multicast QoS flow that corresponds to information about a unicast QoS flow, to release the association relationship between the QoS flow in the second unicast session and the multicast QoS flow of the first multicast group. The information about the unicast QoS flow may include a QoS parameter in a unicast session, and may be a QoS parameter of the unicast QoS flow. The information about the multicast QoS flow may include either of the following: identification information of the multicast QoS flow and the identification information of the multicast group.

For example, based on the example shown in Table 1, if the first terminal is the terminal 1 and the serving multicast QoS flow is the multicast QoS flow 1 in the multicast session 4, when the terminal 1 leaves the multicast group, because the multicast QoS flow 1 in the multicast session 4 corresponds to the unicast QoS flow 1 in the unicast session 1 of the terminal 1, the unicast SMF served by the first terminal may delete information about the multicast QoS flow corresponding to the unicast QoS flow 1 in the unicast session 1 of the terminal 1.

It should be noted that in some cases, the unicast QoS flow of the terminal is specially established for the multicast group. The unicast QoS flow is a unicast QoS flow specially used for receiving multicast data when a channel state of the terminal is poor or an access network device that the terminal is handed over to does not support multicast delivery. In this case, if the terminal leaves the multicast group, unicast context information of the unicast QoS flow may be further deleted. For example, based on the example shown in Table 1, if the first terminal is the terminal 1 and the serving multicast QoS flow is the multicast QoS flow 1 in the multicast session 4, when the terminal 1 leaves the multicast group, because the multicast QoS flow 1 in the multicast session 4 corresponds to the unicast QoS flow 1 in the unicast session 1 of the terminal 1, and the unicast QoS flow 1 in the unicast session 1 of the terminal 1 is specially established for the multicast group, the unicast SMF served by the first terminal may delete information about the multicast QoS flow corresponding to the unicast QoS flow 1 in the unicast session 1 of the terminal 1, and may further delete unicast context information of the unicast QoS flow 1 in the unicast session 1.

In another implementation of the foregoing method, step 1101 and step 1102 may be replaced with the following: The AF sends the member change information of the first multicast group to the first unicast SMF. Correspondingly, the first unicast SMF receives the member change information of the first multicast group from the AF. The AF may directly send the member change information of the first multicast group to the first unicast SMF, or may send the member change information of the first multicast group to the first unicast SMF via the NEF, a UDM, a PCF, an NRF, or another network element. In this case, step 1103 may be replaced with the following: The first unicast SMF releases the association relationship between the QoS flow in the second unicast session and the multicast QoS flow of the first multicast group based on the member change information of the first multicast group.

In addition, the access network device may store the unicast context information and second context information of the multicast group. The unicast context information includes the correspondence between the information about the unicast QoS flow and the information about the multicast QoS flow. The second context information of the multicast group may include any one of the following information: information about a terminal that is in the first multicast group and that accesses the access network device, a multicast QoS parameter, and the like. It should be noted that if the second context information of the multicast group does not include the information about the terminal that is in the first multicast group and that accesses the access network device, the access network device may determine, by traversing the unicast context information, the terminal that is in the first multicast group and that accesses the access network device. After the first terminal leaves the first multicast group, the access network device may also update the unicast context information and the second context information of the multicast group. The following manner 31 or manner 32 may be used for implementation.

Manner 31: The first unicast SMF sends first information to an access network device accessed by the first terminal, where the first information includes either or both of the following information: the first indication information or second indication information. The first indication information indicates that the first terminal leaves the first multicast group, and the second indication information indicates to release an association relationship between a QoS flow in a unicast session of the first terminal and the multicast QoS flow of the first multicast group. Correspondingly, the access network device receives the first information from the first unicast SMF, and performs one or more of the following operations based on the first information:

(1) deleting context information of the first terminal that is related to receiving multicast data of the first multicast group, that is, deleting a resource for receiving the multicast data by the first terminal, for example, deleting a radio bearer corresponding to the multicast data, to avoid a waste of resources;

(2) deleting information about the first terminal in the first multicast group, for example, deleting the identification information of the first terminal in the first multicast group; or (3) releasing the association relationship between the QoS flow in the unicast session of the first terminal and the multicast QoS flow of the first multicast group.

The second indication information may include the identification information of the first terminal and the identification information of the first multicast group. Optionally, a release identifier is further included.

In an implementation, the first information may be carried in a PDU session resource setup request transfer (PDU Session Resource Setup Request Transfer) information element, and the first unicast SMF sends, via an AMF, the first information to the access network device accessed by the first terminal.

Manner 32: The first unicast SMF sends a QoS parameter of the second unicast session to an access network device accessed by the first terminal. Correspondingly, the access network device receives the QoS parameter of the second unicast session from the first unicast SMF, and releases the association relationship between the QoS flow in the second unicast session and the multicast QoS flow of the first multicast group based on the QoS parameter of the second unicast session. Further, the access network device may further delete context information of the first terminal that is related to receiving multicast data of the first multicast group and/or delete information about the first terminal in the first multicast group based on the QoS parameter of the second unicast session.

The second unicast session is a unicast session of the first terminal, and the second unicast session corresponds to the first multicast group. In the manner 32, the QoS parameter of the second unicast session that does not include the information about the multicast QoS flow is sent to the access network device accessed by the first terminal, to indirectly indicate that the first terminal leaves the first multicast group. The first unicast SMF may send, when triggered by the fact that the first terminal leaves the first multicast group, the QoS parameter of the second unicast session to the access network device accessed by the first terminal.

The first terminal does not need to receive the multicast data when the first terminal leaves the first multicast group. Therefore, the method further includes: The access network device sends third indication information to the first terminal, where the third indication information indicates the first terminal not to receive the multicast data. Correspondingly, the first terminal receives the third indication information from the access network device, and determines, based on the third indication information, not to receive the multicast data, or the access network device reconfigures, for the first multicast group, a resource for receiving the multicast data, so that the first terminal cannot receive the multicast data based on an original resource. The third indication information may be carried in an RRC message, for example, carried in an RRC reconfiguration message.

In an implementation, the QoS parameter of the second unicast session may be carried in a PDU session resource setup request transfer information element, and the first unicast SMF sends, via an AMF, the QoS parameter of the second unicast session to the access network device accessed by the first terminal.

According to the method provided in the embodiment shown in FIG. 11, when the terminal leaves the multicast group, the association relationship between the QoS flow in the unicast session of the terminal and the multicast QoS flow of the multicast group may be released, to prevent the terminal that leaves the multicast group from receiving the multicast data again, and avoid a waste of resources.

It should be noted that the embodiment shown in FIG. 10 and the embodiment shown in FIG. 11 may be implemented in combination. For example, the embodiment shown in FIG. 11 may be performed after the embodiment shown in FIG. 10 is performed, or the embodiment shown in FIG. 10 may be performed after the embodiment shown in FIG. 11 is performed, or the embodiment shown in FIG. 10 and the embodiment shown in FIG. 11 may be simultaneously performed. When the embodiments are implemented in combination, information sent by a network element A to a network element B in the embodiment shown in FIG. 10 and information sent by the network element A to the network element B in the embodiment shown in FIG. 11 may be carried in a same message, or may be carried in different messages. This is not limited in this application. For example, the first multicast parameter sent by the AF to the M-SMF in the embodiment shown in FIG. 10 and the member change information of the first multicast group sent by the AF to the M-SMF in the embodiment shown in FIG. 11 may be carried in a same message, or may be carried in different messages.

To make the foregoing embodiments of this application clearer, the following describes the foregoing embodiments by using embodiments shown in FIG. 12A and FIG. 12B to FIG. 15A and FIG. 15B. In the embodiments shown in FIG. 12A and FIG. 12B to FIG. 14A to FIG. 14C, the procedure of the embodiment shown in FIG. 10 is described by using an example in which a QoS parameter is updated. Procedures shown in the embodiments shown in FIG. 12A and FIG. 12B to FIG. 14A to FIG. 14C are three implementation procedures of the embodiment shown in FIG. 10. In the embodiment shown in FIG. 15A and FIG. 15B, the procedure of the embodiment shown in FIG. 11 is described by using an example.

Figure 12A:
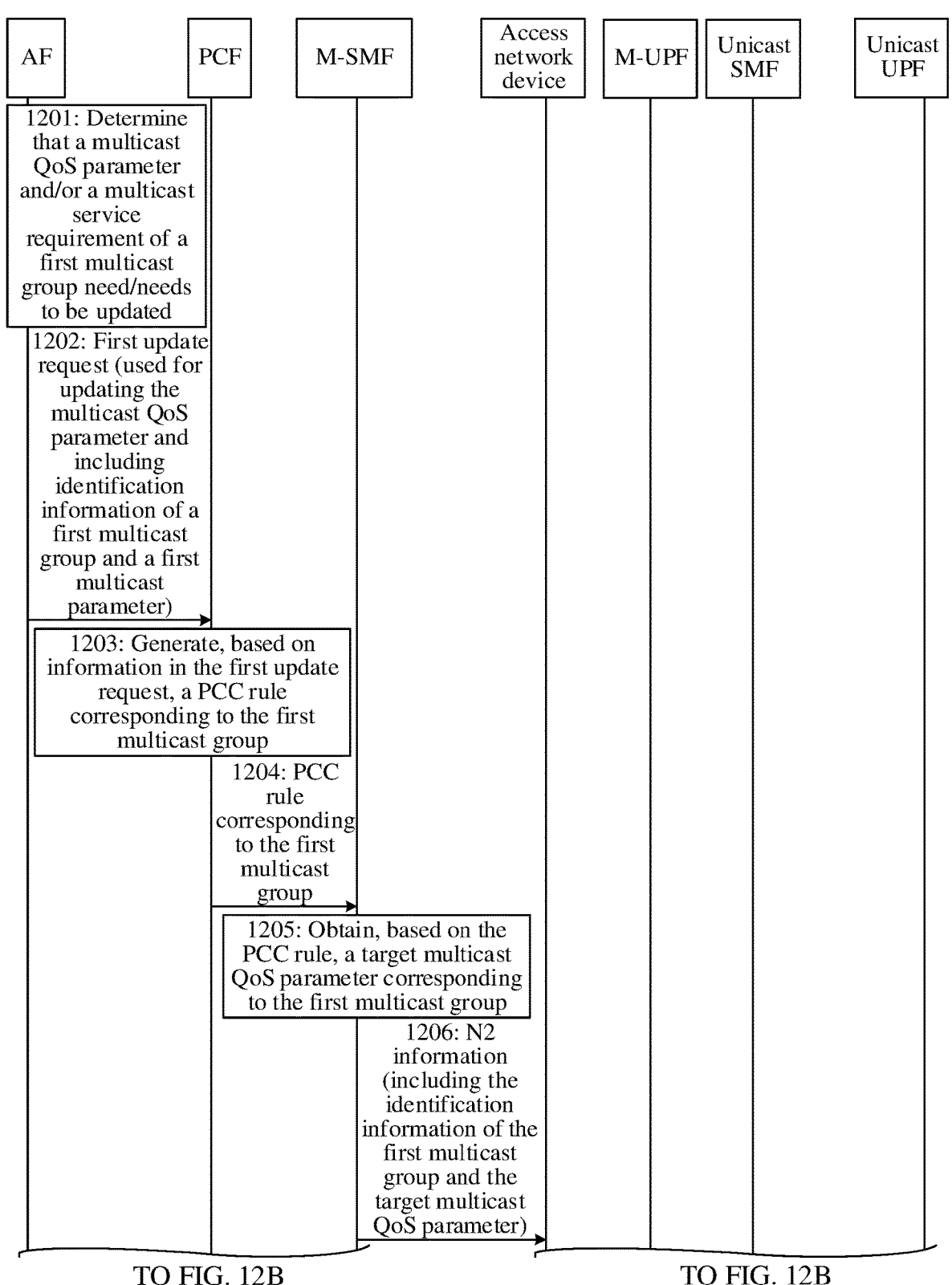

Refer to FIG. 12A and FIG. 12B. The method includes the following steps.

1201: The AF determines that a multicast QoS parameter and/or a multicast service requirement of a first multicast group need/needs to be updated.

1202: The AF sends a first update request to the PCF, where the first update request is used for updating the multicast QoS parameter. Correspondingly, the PCF receives the first update request from the AF.

The AF may directly send the first update request to the PCF, or may send the first update request to the PCF via the NEF or another network element. The first update request includes identification information of the first multicast group and a first multicast parameter. For descriptions of the first multicast parameter, refer to the foregoing descriptions. Details are not described herein again. In the embodiments shown in FIG. 12A and FIG. 12B to FIG. 14A to FIG. 14C, the embodiment shown in FIG. 10 is described by using an example in which the identification information of the first multicast group and the first multicast parameter are independent information.

1203: The PCF generates, based on information in the first update request, a PCC rule corresponding to the first multicast group.

1204: The PCF sends the PCC rule corresponding to the first multicast group to the M-SMF. Correspondingly, the M-SMF receives the PCC rule corresponding to the first multicast group from the PCF.

The PCC rule corresponding to the first multicast group may be carried in a multicast session management policy update notification message. The PCF may determine that an M-SMF corresponding to the identification information of the first multicast group is the M-SMF receiving the PCC rule.

Optionally, the multicast session management policy update notification message further includes the identification information of the first multicast group, for the M-SMF to determine a multicast group to which the PCC rule corresponds.

1205: The M-SMF obtains, based on the PCC rule, a target multicast QoS parameter corresponding to the first multicast group. The target multicast QoS parameter is used for updating a QoS parameter corresponding to the first multicast group.

1206: The M-SMF sends N2 information to the access network device, where the N2 information includes the identification information of the first multicast group and the target multicast QoS parameter. Correspondingly, the access network device receives the N2 information from the M-SMF.

In FIG. 12A and FIG. 12B to FIG. 14A to FIG. 14C, the embodiment shown in FIG. 10 is described by using an example in which the identification information of the first multicast group and the target multicast QoS parameter are independent information.

1207: The access network device updates, based on the target multicast QoS parameter, the QoS parameter corresponding to the first multicast group.

Further, the access network device may update, based on the target multicast QoS parameter, a QoS parameter of a unicast session, corresponding to the first multicast group, of each terminal in the first multicast group.

1208: The access network device sends N2 information to the M-SMF, where the N2 information includes update result information, and the update result information indicates whether the update succeeds. Correspondingly, the M-SMF receives the N2 information from the access network device.

1209: The M-SMF configures the M-UPF.

Step 1209 may be performed when the received update result information indicates that the update succeeds.

1210: The M-SMF sends a second update request to a unicast SMF corresponding to the first multicast group, where the second update request includes the target multicast QoS parameter. Correspondingly, the unicast SMF receives the second update request from the M-SMF.

The M-SMF may store first context information of the first multicast group, and the M-SMF may obtain the first context information of the first multicast group based on the identification information of the first multicast group. The terminal in the first multicast group and the unicast SMF corresponding to the terminal in the first multicast group may be determined based on the first context information of the first multicast group.

1211: The unicast SMF updates, based on the target multicast QoS parameter, a QoS parameter of a unicast session corresponding to the first multicast group.

1212: The unicast SMF sends first configuration information to a unicast UPF corresponding to the unicast session, where the first configuration information is used for configuring a rule of multicast data of the first multicast group. Correspondingly, the unicast UPF receives the first configuration information from the unicast SMF.

1213: The unicast UPF configures the rule of the multicast data of the first multicast group based on the first configuration information.

Figure 13A:
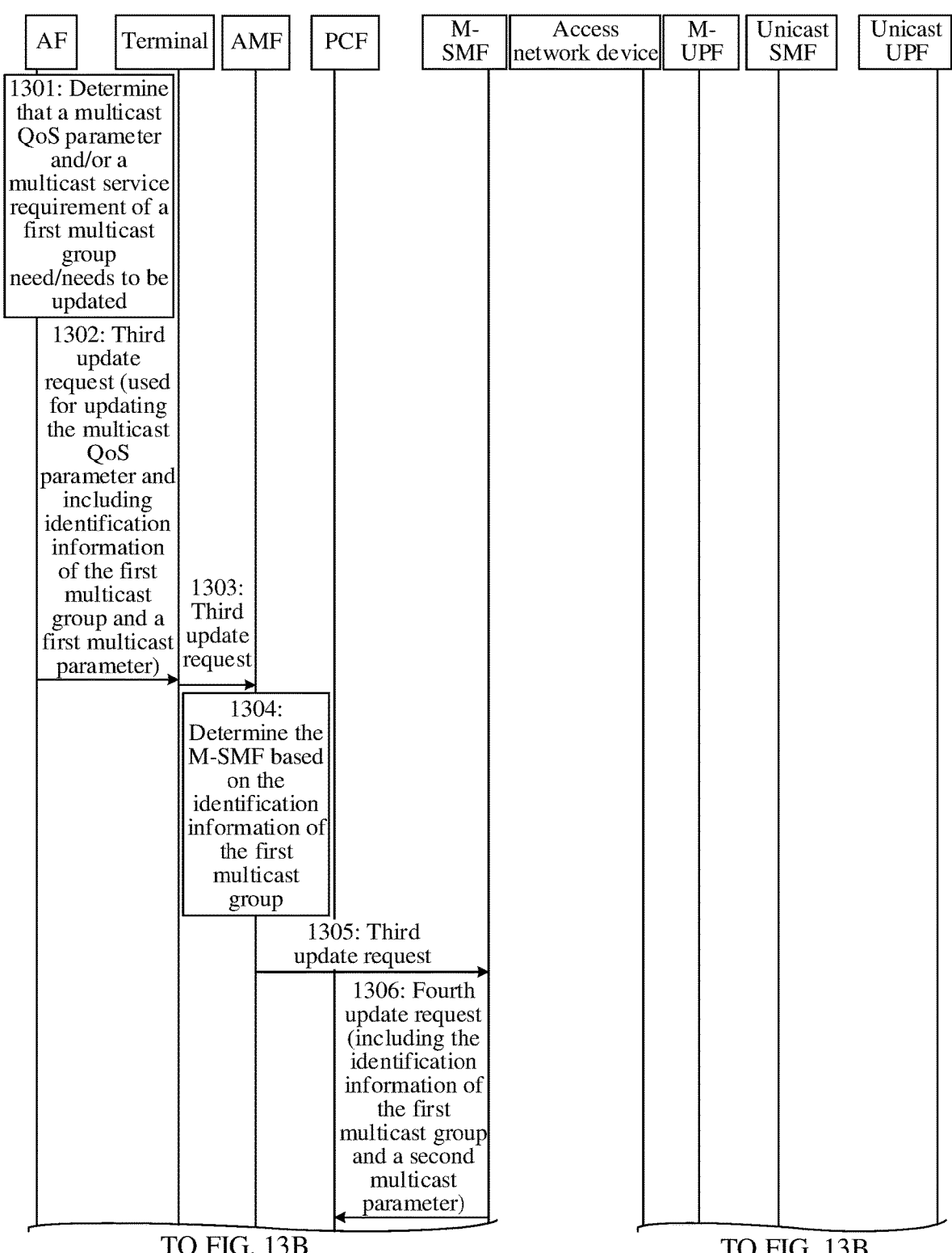
FIG. 13A to FIG. 13C are a flowchart of another communication method according to an embodiment of this application.
Figure 13B:
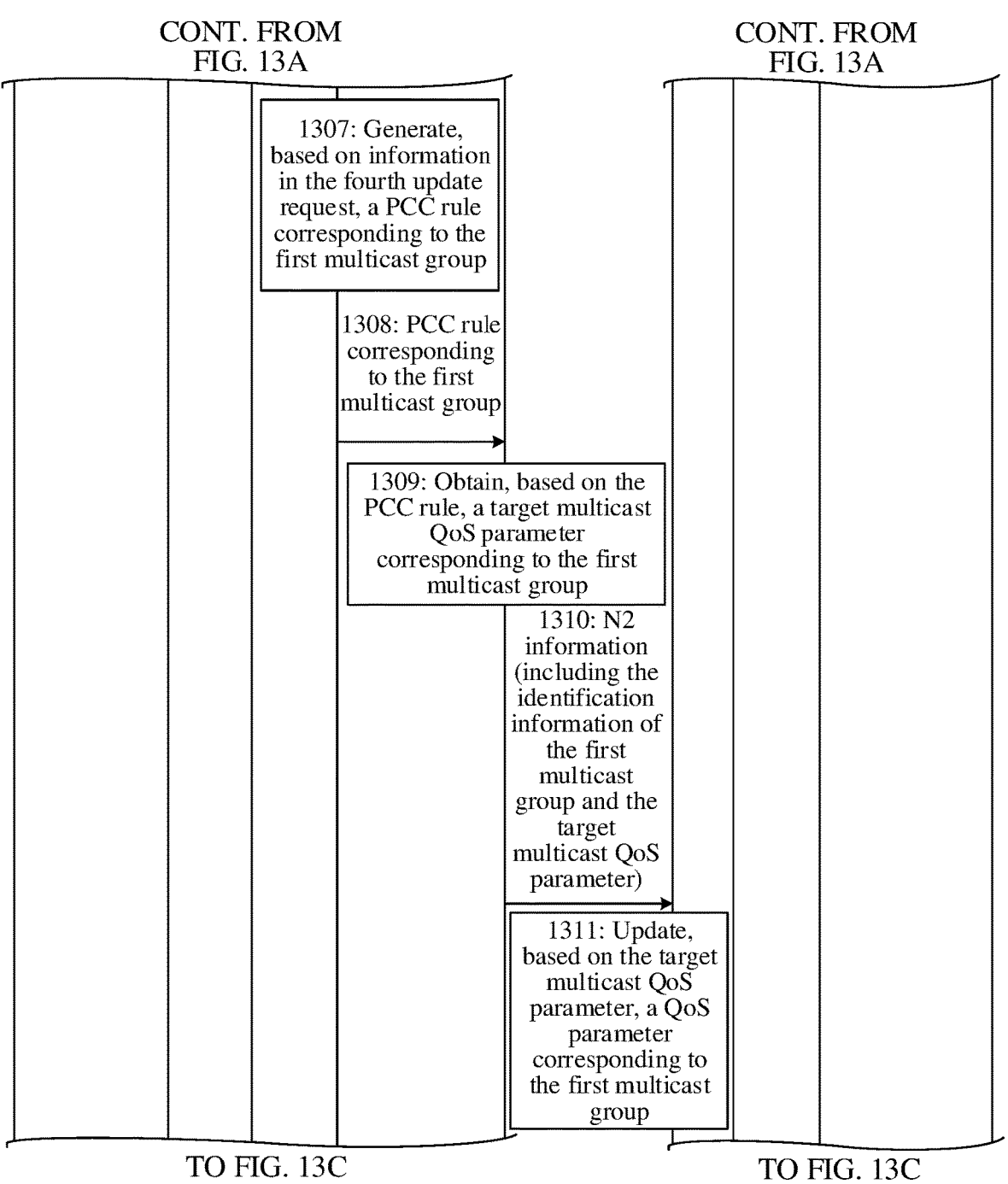
Figure 13C:
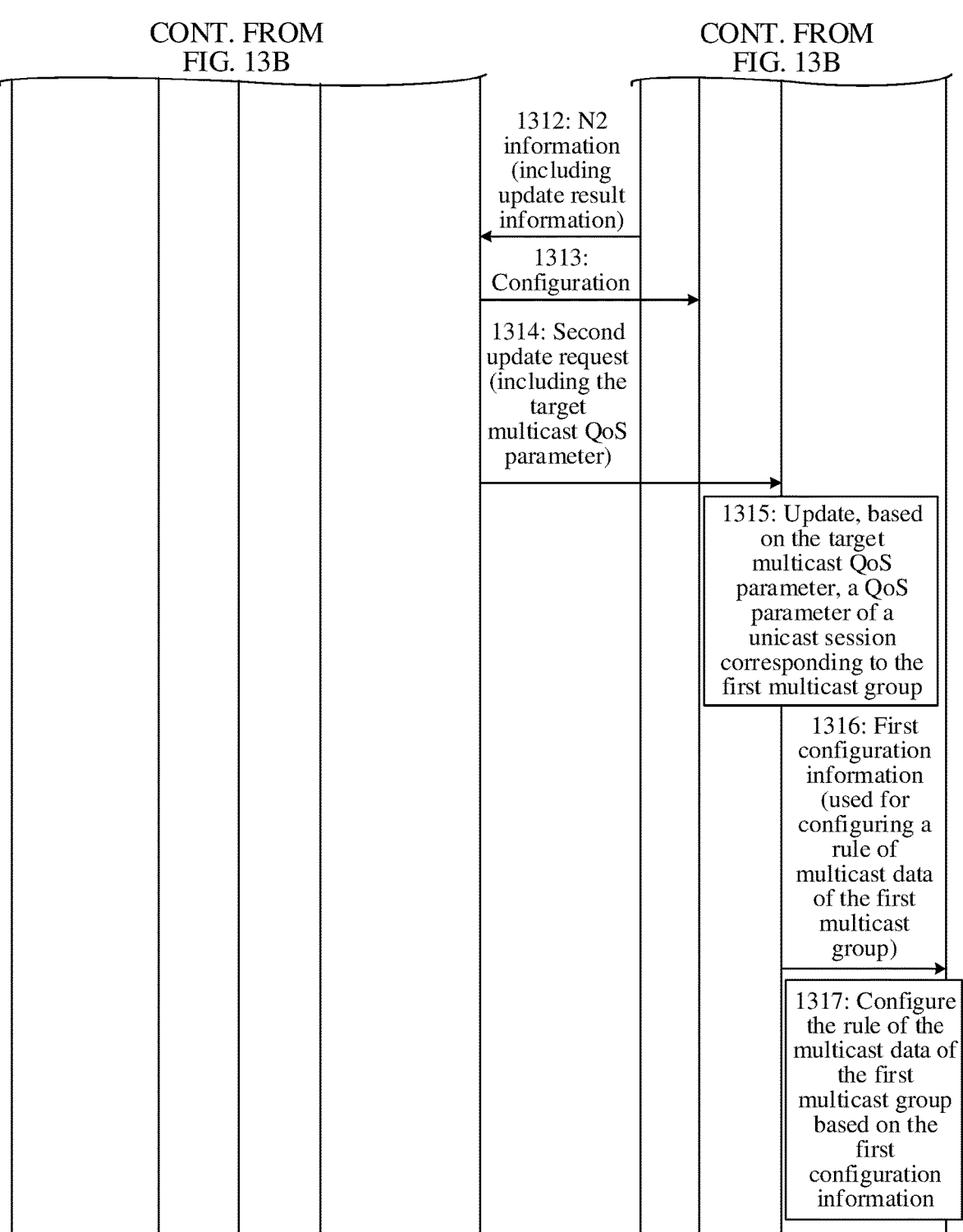

Refer to FIG. 13A to FIG. 13C. The method includes the following steps.

1301: This step is the same as step 1201.

1302: The AF sends a third update request to the terminal, where the third update request is used for updating a multicast QoS parameter. Correspondingly, the terminal receives the third update request from the AF.

The third update request includes identification information of the first multicast group and a first multicast parameter. The third update request may be an application layer message.

1303: The terminal sends the third update request to the AMF. Correspondingly, the AMF receives the third update request from the terminal.

The third update request may be carried in a non-access stratum (NAS) message.

1304: The AMF determines an M-SMF based on the identification information of the first multicast group.

Different multicast groups may be managed by different M-SMFs. There may be a correspondence between identification information of a multicast group and identification information of an M-SMF. In this case, after the identification information of the first multicast group is learned of, it only needs to determine that an M-SMF corresponding to the first multicast group is an M-SMF that manages the first multicast group.

1305: The AMF sends the third update request to the M-SMF. Correspondingly, the M-SMF receives the third update request from the AMF.

1306: The M-SMF sends a fourth update request to the PCF, where the fourth update request includes the identification information of the first multicast group and a second multicast parameter. Correspondingly, the PCF receives the fourth update request from the M-SMF.

The second multicast parameter is the same as the first multicast parameter or is obtained based on the first multicast parameter, and the second multicast parameter is used for generating a PCC rule. For other descriptions of the second multicast parameter, refer to related descriptions in the embodiment shown in FIG. 10. Details are not described herein again. For example, the fourth update request may be a session policy request message.

1307: The PCF generates, based on information in the fourth update request, a PCC rule corresponding to the first multicast group.

1308: The PCF sends the PCC rule corresponding to the first multicast group to the M-SMF. Correspondingly, the M-SMF receives the PCC rule from the PCF.

The PCC rule corresponding to the first multicast group may be carried in a third update response. The third update response may further include the identification information of the first multicast group. The third update response may be, for example, a session policy response message.

1309 to 1317 are respectively the same as step 1205 to step 1213.

Figure 14A:
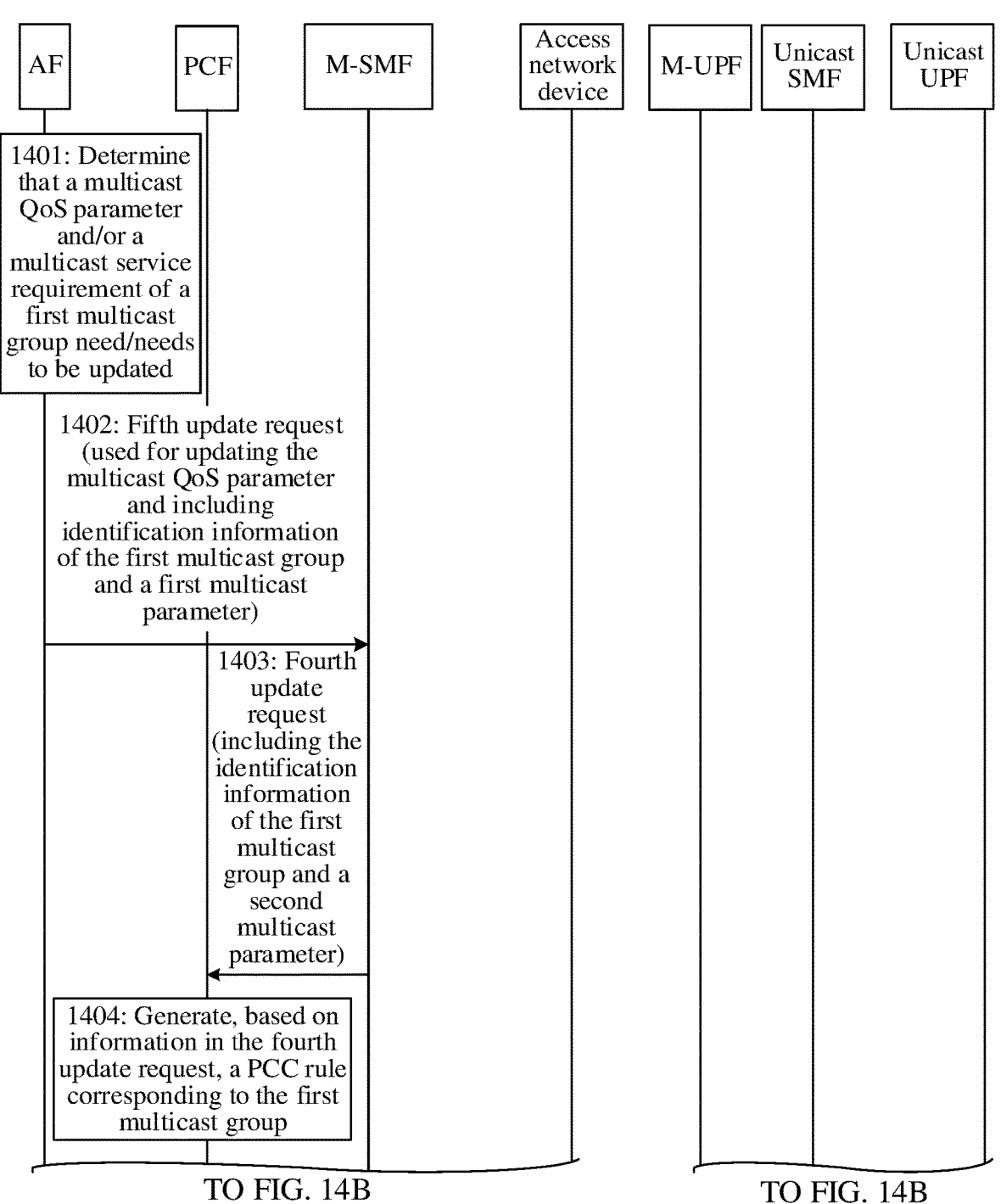
Figure 14C:
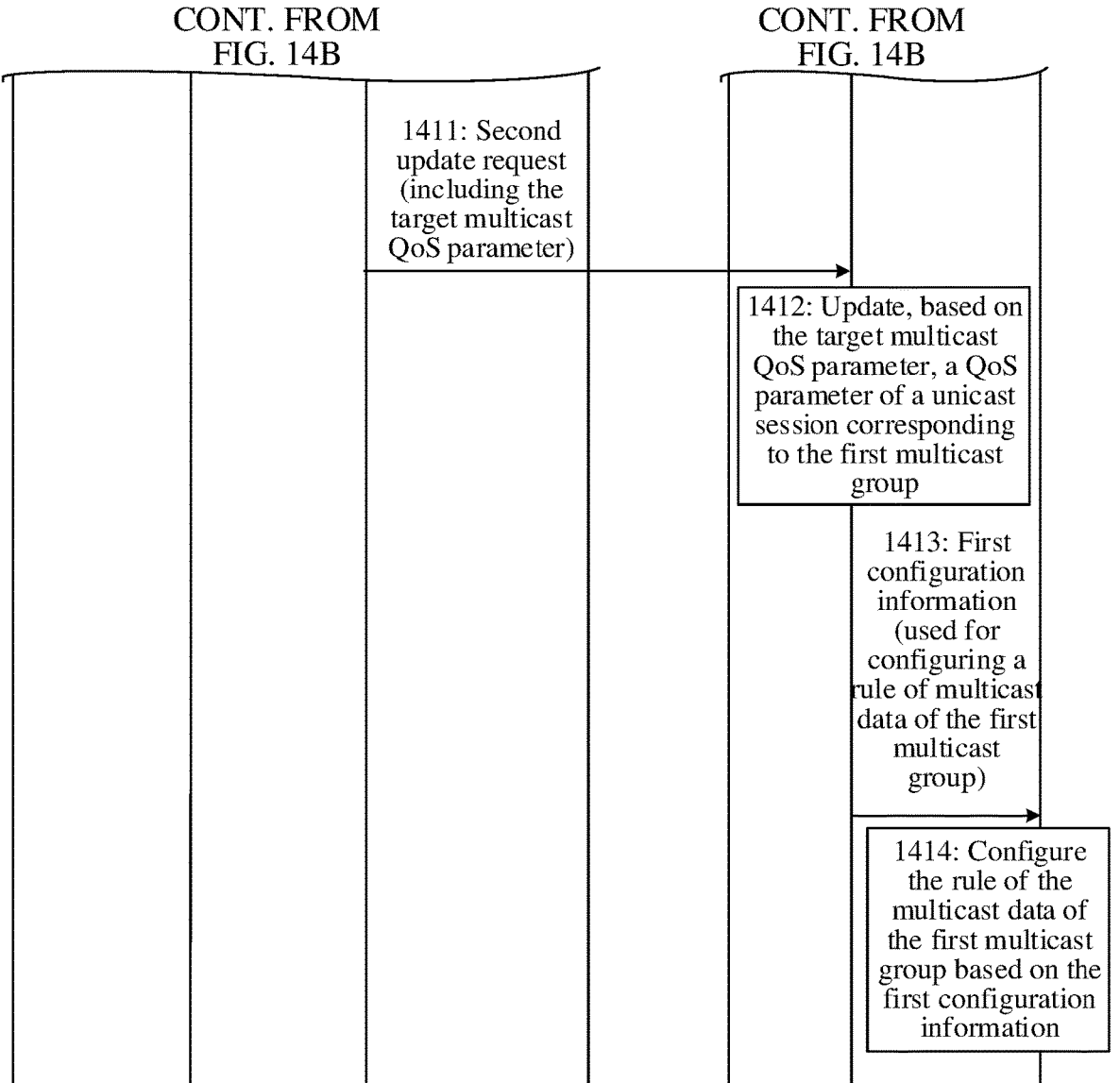

Refer to FIG. 14A to FIG. 14C. The method includes the following steps.

1401: This step is the same as step 1201.

1402: The AF sends a fifth update request to the M-SMF, where the fifth update request is used for updating a multicast QoS parameter. Correspondingly, the M-SMF receives the fifth update request from the AF.

The fifth update request includes identification information of the first multicast group and a first multicast parameter. The AF may directly send the fifth update request to the M-SMF, or may send the fifth update request to the M-SMF via the NEF or another network element.

1403 to 1414 are respectively the same as step 1306 to step 1317.

For implementations of the steps in the embodiments shown in FIG. 12A and FIG. 12B to FIG. 14A to FIG. 14C, refer to related descriptions of the embodiment shown in FIG. 10. To avoid repetition, details are not described again.

Figure 15A:
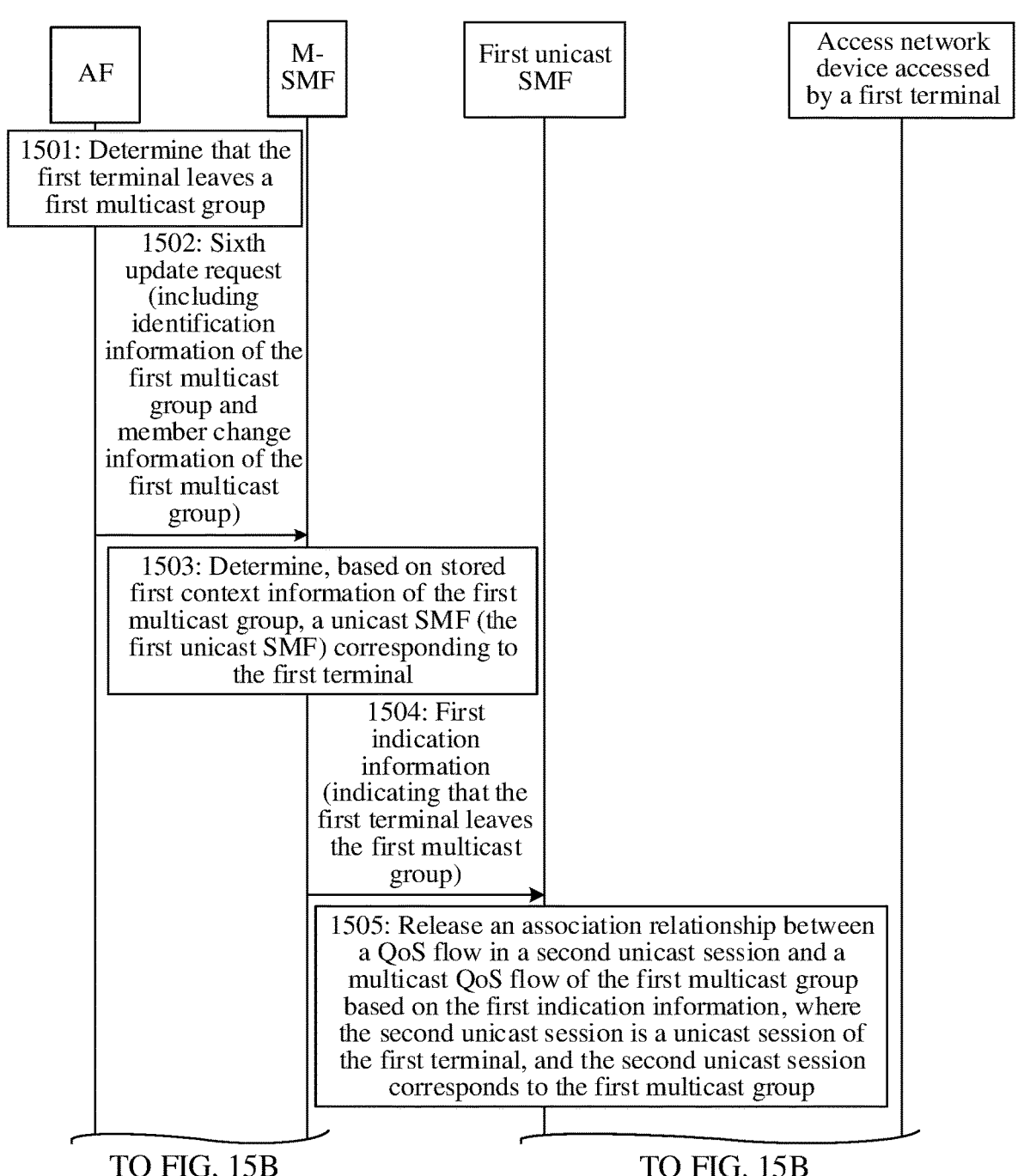

Refer to FIG. 15A and FIG. 15B. The method includes the following steps.

1501: The AF determines that a first terminal leaves a first multicast group.

1502: The AF sends a sixth update request to the M-SMF, where the sixth update request includes identification information of the first multicast group and member change information of the first multicast group. Correspondingly, the M-SMF receives the sixth update request from the AF.

The AF may directly send the sixth update request to the M-SMF, or may send the sixth update request to the M-SMF via the NEF or another network element.

1503: The M-SMF determines, based on the stored first context information of the first multicast group, a unicast SMF (the first unicast SMF in the foregoing descriptions) corresponding to the first terminal.

1504: The M-SMF sends first indication information to the first unicast SMF, where the first indication information indicates that the first terminal leaves the first multicast group. Correspondingly, the first unicast SMF receives the first indication information from the M-SMF.

1505: The first unicast SMF releases an association relationship between a QoS flow in a second unicast session and a multicast QoS flow of the first multicast group based on the first indication information, where the second unicast session is a unicast session of the first terminal, and the second unicast session corresponds to the first multicast group.

1506: The first unicast SMF sends first information to the access network device accessed by the first terminal, where the first information includes either or both of the following information: the first indication information or second indication information, the first indication information indicates that the first terminal leaves the first multicast group, and the second indication information indicates to release an association relationship between a QoS flow in a unicast session of the first terminal and the multicast QoS flow of the first multicast group. Correspondingly, the access network device receives the first information from the first unicast SMF.

1507: The access network device performs one or more of the following operations based on the first information:

(1) deleting context information of the first terminal that is related to receiving multicast data of the first multicast group, that is, deleting a resource for receiving the multicast data by the first terminal, for example, deleting a radio bearer corresponding to the multicast data, to avoid a waste of resources;

(2) deleting information about the first terminal in the first multicast group, for example, deleting identification information of the first terminal in the first multicast group; or (3) releasing the association relationship between the QoS flow in the unicast session of the first terminal and the multicast QoS flow of the first multicast group.

For implementations of the steps in the embodiment shown in FIG. 15A and FIG. 15B, refer to related descriptions of the embodiment shown in FIG. 11. To avoid repetition, details are not described again.

Each update request in the embodiments shown in FIG. 12A and FIG. 12B to FIG. 15A and FIG. 15B may be an existing message, or may be a newly defined message. This is not limited in this application.

A system architecture and a service scenario described in embodiments of this application are intended to describe the technical solutions in embodiments of this application more clearly, and do not constitute a limitation on the technical solutions provided in embodiments of this application. A person of ordinary skill in the art may learn that the technical solutions provided in embodiments of this application are also applicable to a similar technical problem as a network architecture evolves and a new service scenario emerges.

The foregoing mainly describes the solutions in embodiments of this application from a perspective of the method. It may be understood that, to implement the foregoing functions, each network element, for example, the M-SMF, the unicast SMF, the access network device, the PCF, the AF, the unicast UPF, or the AMF, includes at least one of a corresponding hardware structure or a corresponding software module for performing each function. A person skilled in the art should easily be aware that the network element and algorithm steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional unit division may be performed on the M-SMF, the unicast SMF, the access network device, the PCF, the AF, the unicast UPF, and the AMF based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that in embodiments of this application, unit division is an example, and is merely logical function division. During actual implementation, another division manner may be used.

Figure 16:
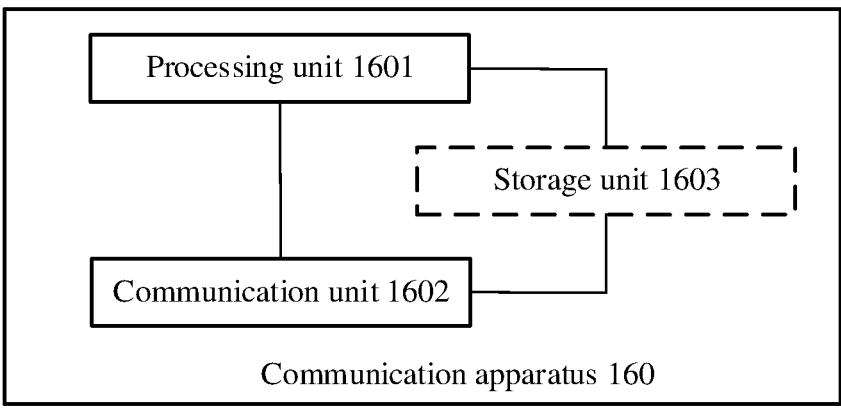
FIG. 16 is a schematic diagram of composition of a communication apparatus according to an embodiment of this application.

For example, FIG. 16 is a diagram of a communication apparatus (denoted as a communication apparatus 160) in the foregoing embodiments. The communication apparatus 160 includes a processing unit 1601 and a communication unit 1602. Optionally, a storage unit 1603 is included. The communication apparatus 160 may be configured to illustrate structures of the M-SMF, the unicast SMF, the access network device, the PCF, the AF, the unicast UPF, and the AMF in the foregoing embodiments.

When the schematic structural diagram shown in FIG. 16 is used for illustrating the structure of the M-SMF in the foregoing embodiments, the processing unit 1601 is configured to control and manage an operation of the M-SMF. For example, the processing unit 1601 is configured to perform 1001 to 1003 in FIGS. 10, 1101 and 1102 in FIGS. 11, 1204 to 1206 and 1208 to 1210 in FIG. 12A and FIG. 12B, 1305, 1306, 1308 to 1310, and 1312 to 1314 in FIG. 13A to FIG. 13C, 1402, 1403, 1405 to 1407, 1409 to 1411 in FIG. 14A to FIG. 14C, 1502 to 1504 in FIG. 15A and FIG. 15B, and/or operations performed by the M-SMF in another process described in embodiments of this application. The processing unit 1601 may communicate with another network entity by using the communication unit 1602, for example, communicate with the PCF in FIG. 10. The storage unit 1603 is configured to store program code and data of the M-SMF.

When the schematic structural diagram shown in FIG. 16 is used for illustrating the structure of the unicast SMF in the foregoing embodiments, the processing unit 1601 is configured to control and manage the operation of the unicast SMF. For example, the processing unit 1601 is configured to perform 1102 and 1103 in FIGS. 11, 1210 to 1212 in FIG. 12A and FIG. 12B, 1314 to 1316 in FIG. 13A to FIG. 13C, 1411 to 1413 in FIG. 14A to FIG. 14C, 1504 to 1506 in FIG. 15A and FIG. 15B, and/or operations performed by the unicast SMF in another process described in embodiments of this application. The processing unit 1601 may communicate with another network entity by using the communication unit 1602, for example, communicate with the M-SMF in FIG. 11. The storage unit 1603 is configured to store program code and data of the unicast SMF.

When the schematic structural diagram shown in FIG. 16 is used for illustrating the structure of the access network device in the foregoing embodiments, the processing unit 1601 is configured to control and manage the operation of the access network device. For example, the processing unit 1601 is configured to perform 1003 and 1004 in FIGS. 10, 1206 to 1208 in FIG. 12A and FIG. 12B, 1310 to 1312 in FIG. 13A to FIG. 13C, 1407 to 1409 in FIG. 14A to FIG. 14C, 1506 and 1507 in FIG. 15A and FIG. 15B, and/or operations performed by the access network device in another process described in embodiments of this application. The processing unit 1601 may communicate with another network entity by using the communication unit 1602, for example, communicate with the M-SMF in FIG. 10. The storage unit 1603 is configured to store program code and data of the access network device.

When the schematic structural diagram shown in FIG. 16 is used for illustrating the structure of the PCF in the foregoing embodiments, the processing unit 1601 is configured to control and manage the operation of the PCF. For example, the processing unit 1601 is configured to perform 1001 in FIGS. 10, 1202 to 1204 in FIG. 12A and FIG. 12B, 1306 to 1308 in FIG. 13A to FIG. 13C, 1403 to 1405 in FIG. 14A to FIG. 14C, and/or operations performed by the PCF in another process described in embodiments of this application. The processing unit 1601 may communicate with another network entity by using the communication unit 1602, for example, communicate with the M-SMF in FIG. 10. The storage unit 1603 is configured to store program code and data of the PCF.

When the schematic structural diagram shown in FIG. 16 is used for illustrating the structure of the AF in the foregoing embodiments, the processing unit 1601 is configured to control and manage the operation of the AF. For example, the processing unit 1601 is configured to perform 1101 in FIGS. 11, 1201 and 1202 in FIG. 12A and FIG. 12B, 1301 and 1302 in FIG. 13A to FIG. 13C, 1401 and 1402 in FIG. 14A to FIG. 14C, 1501 and 1502 in FIG. 15A and FIG. 15B, and/or operations performed by the AF in another process described in embodiments of this application. The processing unit 1601 may communicate with another network entity by using the communication unit 1602, for example, communicate with the M-SMF in FIG. 11. The storage unit 1603 is configured to store program code and data of the AF.

When the schematic structural diagram shown in FIG. 16 is used for illustrating the structure of the unicast UPF in the foregoing embodiments, the processing unit 1601 is configured to control and manage the operation of the unicast UPF. For example, the processing unit 1601 is configured to perform 1212 and 1213 in FIG. 12A and FIG. 12B, 1316 and 1317 in FIG. 13A to FIG. 13C, 1413 and 1414 in FIG. 14A to FIG. 14C, and/or operations performed by the unicast UPF in another process described in embodiments of this application. The processing unit 1601 may communicate with another network entity by using the communication unit 1602, for example, communicate with the unicast SMF in FIG. 14A to FIG. 14C. The storage unit 1603 is configured to store program code and data of the unicast UPF.

When the schematic structural diagram shown in FIG. 16 is used for illustrating the structure of the AMF in the foregoing embodiments, the processing unit 1601 is configured to control and manage the operation of the AMF. For example, the processing unit 1601 is configured to perform 1303 to 1305 in FIG. 13A to FIG. 13C, and/or operations performed by the AMF in another process described in embodiments of this application. The processing unit 1601 may communicate with another network entity by using the communication unit 1602, for example, communicate with the terminal in FIG. 13A to FIG. 13C. The storage unit 1603 is configured to store program code and data of the AMF.

For example, the communication apparatus 160 may be a device, or may be a chip or a chip system.

When the communication apparatus 160 is the device, the processing unit 1601 may be a processor. The communication unit 1602 may be a communication interface, a transceiver, or an input interface and/or an output interface.

Optionally, the transceiver may be a transceiver circuit. Optionally, the input interface may be an input circuit, and the output interface may be an output circuit.

When the communication apparatus 160 is the chip or the chip system, the communication unit 1602 may be a communication interface, an input interface and/or an output interface, an interface circuit, an output circuit, an input circuit, a pin, a related circuit, or the like on the chip or the chip system. The processing unit 1601 may be a processor, a processing circuit, a logic circuit, or the like.

When the integrated unit in FIG. 16 is implemented in a form of a software functional module and sold or used as an independent product, the integrated unit may be stored in a computer-readable storage medium. Based on such an understanding, the technical solutions in embodiments of this application essentially, or the part contributing to the current technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this application. Storage media for storing the computer software product include: any medium that can store program code, such as a USB flash drive, a removable hard disk, a read-only memory (ROM), a random access memory (RAM), a magnetic disk, or an optical disc.

Figure 17:
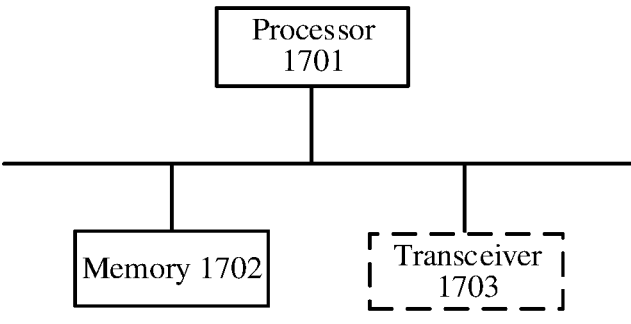
FIG. 17 is a schematic diagram of a hardware structure of a communication apparatus according to an embodiment of this application.
Figure 18:
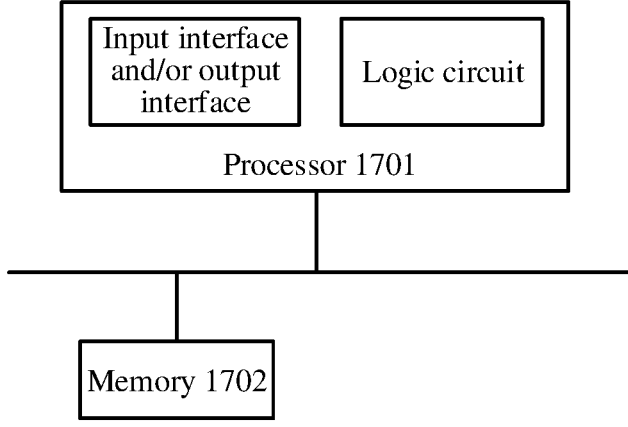
FIG. 18 is a schematic diagram of a hardware structure of another communication apparatus according to an embodiment of this application.

An embodiment of this application further provides a schematic diagram of a hardware structure of a communication apparatus. Refer to FIG. 17 or FIG. 18. The communication apparatus includes a processor 1701, and optionally, further includes a memory 1702 connected to the processor 1701.

The processor 1701 may be a general-purpose central processing unit (CPU), a microprocessor, an application-specific integrated circuit (ASIC), or one or more integrated circuits configured to control program execution of the solutions of this application. The processor 1701 may also include a plurality of CPUs, and the processor 1701 may be a single-CPU processor, or may be a multi-CPU processor. The processor herein may refer to one or more devices, circuits, or processing cores configured to process data (for example, computer program instructions).

The memory 1702 may be a ROM or another type of static storage device that can store static information and instructions, or a RAM or another type of dynamic storage device that can store information and instructions, or may be an electrically erasable programmable read-only memory (EE-PROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. This is not limited in embodiments of this application. The memory 1702 may exist independently (where in this case, the memory 1702 may be located outside the communication apparatus or may be located in the communication apparatus), or may be integrated with the processor 1701. The memory 1702 may include computer program code. The processor 1701 is configured to execute the computer program code stored in the memory 1702, to implement the method provided in embodiments of this application.

In a first implementation, as shown in FIG. 17, the communication apparatus further includes a transceiver 1703. The processor 1701, the memory 1702, and the transceiver 1703 are connected through a bus. The transceiver 1703 is configured to communicate with another device or a communication network. Optionally, the transceiver 1703 may include a transmitter and a receiver. A component configured to implement a receiving function in the transceiver 1703 may be considered as the receiver. The receiver is configured to perform a receiving step in embodiments of this application. A component configured to implement a sending function in the transceiver 1703 may be considered as the transmitter. The transmitter is configured to perform a sending step in embodiments of this application.

Based on the first implementation, a schematic structural diagram shown in FIG. 17 may be used for illustrating structures of the M-SMF, the unicast SMF, the access network device, the PCF, the AF, the unicast UPF, and the AMF in the foregoing embodiments. When the schematic structural diagram shown in FIG. 17 and the schematic structural diagram shown in FIG. 16 are used for illustrating a same network element, the processor 1701 is configured to control and manage an operation of the network element. For example, the processor 1701 is configured to perform an operation of the processing unit 1601, the transceiver 1703 is configured to perform an operation performed by the communication unit 1602, and the memory 1702 is configured to implement a function of the storage unit 1603.

In a second implementation, the processor 1701 includes a logic circuit and an input interface and/or an output interface. For example, the output interface is configured to perform a sending operation in a corresponding method, and the input interface is configured to perform a receiving operation in the corresponding method.

Based on the second implementation, as shown in FIG. 18, a schematic structural diagram shown in FIG. 18 may be used for illustrating structures of the M-SMF, the unicast SMF, the access network device, the PCF, the AF, the unicast UPF, and the AMF in the foregoing embodiments. When the schematic structural diagram shown in FIG. 18 and the schematic structural diagram shown in FIG. 16 are used for illustrating a same network element, the processor 1701 is configured to control and manage an operation of the network element. For example, the processor 1701 is configured to perform an operation of the processing unit 1601, the input interface and/or the output interface are/is configured to perform an operation performed by the communication unit 1602, and the memory 1702 is configured to implement a function of the storage unit 1603.

In an implementation process, the steps in the method provided in embodiments may be completed by using an integrated logic circuit of hardware in the processor or instructions in a form of software. The steps of the method disclosed with reference to embodiments of this application may be directly performed by a hardware processor, or may be performed by a combination of hardware in the processor and a software module.

An embodiment of this application further provides a computer-readable storage medium, including computer executable instructions. When the computer executable instructions are run on a computer, the computer is enabled to perform any one of the foregoing methods.

An embodiment of this application further provides a computer program product including computer executable instructions. When the computer executable instructions are run on a computer, the computer is enabled to perform any one of the foregoing methods.

An embodiment of this application further provides a communication system, including one or more of the M-SMF, the unicast SMF, the access network device, the PCF, the AF, the unicast UPF, and the AMF.

An embodiment of this application further provides a chip, including a processor and an interface. The processor is coupled to the memory via the interface. When the processor executes a computer program or instructions in the memory, any method provided in the foregoing embodiments is performed.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, the term "comprising" does not exclude another component or another step, and "a" or "one" does not exclude a case of plurality. A single processor or another unit may implement several functions enumerated in the claims. Some measures are recorded in dependent claims that are different from each other, but this does not indicate that these measures cannot be combined to produce a better effect.

Although this application is described with reference to features and embodiments thereof, it is clear that various modifications and combinations may be made to this application without departing from the spirit and scope of this application. Correspondingly, the specification and the accompanying drawings are merely example descriptions of this application defined by the following claims, and are considered as any of or all modifications, variations, combinations or equivalents that cover the scope of this application. Clearly, a person skilled in the art can make various modifications and variations to this application without departing from the spirit and scope of this application. In this way, this application is intended to cover these modifications and variations of this application provided that they fall within the scope of the claims of this application and their equivalent technologies.

What is claimed is:

1. A communication method, comprising:

receiving, by a unicast session management function network element, a target multicast quality of service (QOS) parameter corresponding to a first multicast group from a multicast session management function network element, the target multicast QoS parameter comprising an allocation and retention priority (ARP), the target multicast QoS parameter being used for configuring a QoS parameter corresponding to the first multicast group, and the unicast session management function network element is a unicast session management function network element corresponding to the first multicast group; and configuring, by the unicast session management function network element based on the target multicast QoS parameter, a QoS parameter of a unicast session corresponding to the first multicast group.

2. The method according to claim 1, wherein the method further comprises:

determining, by the unicast session management function network element, that a delivery mode of a second terminal is an individual delivery mode, wherein the second terminal belongs to the first multicast group; and sending, by the unicast session management function network element, a target QoS parameter of a first unicast session to an access network device accessed by the second terminal, wherein the first unicast session is a unicast session of the second terminal, and the first unicast session corresponds to the first multicast group.

3. The method according to claim 2, further comprising:

receiving, by the access network device, the target QoS parameter.

4. The method according to claim 1, wherein an identification information of the first multicast group and the target multicast QoS parameter are carried in a same message.

5. The method according to claim 1, further comprising:

sending, by the multicast session management function network element, the target multicast QoS parameter to the unicast session management function network element.

6. A communication method, comprising:

receiving, by an access network device, a target multicast quality of service (QOS) parameter corresponding to a first multicast group from a multicast session management function network element, the target multicast QoS parameter comprising an allocation and retention priority (ARP); and configuring, by the access network device based on the target multicast QoS parameter, a QoS parameter corresponding to the first multicast group.

7. The method according to claim 6, wherein the method further comprises:

configuring, by the access network device, a QoS parameter of a first unicast session based on the target multicast QoS parameter, wherein the first unicast session is of a second terminal, the first unicast session corresponds to the first multicast group, and the second terminal belongs to the first multicast group.

8. The method according to claim 6, further comprising:

receiving, by the access network device, a target QoS parameter of a first unicast session from a second unicast session management function network element, wherein the first unicast session is a unicast session of a second terminal, the first unicast session corresponds to the first multicast group, and the second unicast session management function network element is a unicast session management function network element corresponding to the second terminal; and configuring, by the access network device, the QoS parameter of the first unicast session based on the target QoS parameter of the first unicast session.

9. The method according to claim 6, wherein the target multicast QoS parameter is carried in N2 information.

10. The method according to claim 6, further comprising:

sending, by the multicast session management function network element, the target multicast QoS parameter to the access network device.

11. A communication apparatus, comprising:

a memory storing instructions; and at least one processor in communication with the memory, the at least one processor configured, upon execution of the instructions, to perform the following steps:

receiving a target multicast quality of service (QOS) parameter corresponding to a first multicast group from a multicast session management function network element, the target multicast QoS parameter comprising an allocation and retention priority (ARP), the target multicast QoS parameter being used for configuring a QoS parameter corresponding to the first multicast group, and the unicast session management function network element is a unicast session management function network element corresponding to the first multicast group; and configuring, based on the target multicast QoS parameter, a QoS parameter of a unicast session corresponding to the first multicast group.

12. The communication apparatus according to claim 11, wherein the at least one processor further executes the instructions to:

determine that a delivery mode of a second terminal is an individual delivery mode, wherein the second terminal belongs to the first multicast group; and send a target QoS parameter of a first unicast session to an access network device accessed by the second terminal, wherein the first unicast session is of the second terminal, and the first unicast session corresponds to the first multicast group.

13. The communication apparatus according to claim 11, wherein an identification information of the first multicast group and the target multicast QoS parameter are carried in a same message.

14. A communication apparatus, comprising:

a memory storing instructions; and at least one processor in communication with the memory, the at least one processor configured, upon execution of the instructions, to perform the following steps:

receiving a target multicast quality of service (QOS) parameter corresponding to a first multicast group from a multicast session management function network element, the target multicast QoS parameter comprising an allocation and retention priority (ARP); and configuring, based on the target multicast QoS parameter, a QoS parameter corresponding to the first multicast group.

15. The communication apparatus according to claim 14, wherein the at least one processor further executes the instructions to:

configure a QoS parameter of a first unicast session based on the target multicast QOS parameter, wherein the first unicast session is of a second terminal, the first unicast session corresponds to the first multicast group, and the second terminal belongs to the first multicast group.

16. The communication apparatus according to claim 14, wherein the at least one processor further executes the instructions to:

receive a target QoS parameter of a first unicast session from a second unicast session management function network element, wherein the first unicast session is of a second terminal, the first unicast session corresponds to the first multicast group, and the second unicast session management function network element is a unicast session management function network element corresponding to the second terminal; and configure the QoS parameter of the first unicast session based on the target QoS parameter of the first unicast session.

17. The communication apparatus according to claim 14, wherein the target multicast QoS parameter is carried in N2 information.

* * * * *